United States Patent
Park et al.

(10) Patent No.: US 11,595,909 B2
(45) Date of Patent: *Feb. 28, 2023

(54) METHOD FOR CONTROLLING UPLINK POWER BASED ON DOWNLINK PATH LOSS AND CONFIGURATION INDICATED BY BASE STATION

(71) Applicant: LG ELECTRONICS INC., Seoul (KR)

(72) Inventors: Jonghyun Park, Seoul (KR); Hanbyul Seo, Seoul (KR); Kijun Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,243

(22) Filed: Jun. 9, 2021

(65) Prior Publication Data

US 2021/0297956 A1 Sep. 23, 2021

Related U.S. Application Data

(63) Continuation of application No. 16/064,321, filed as application No. PCT/KR2018/000168 on Jan. 4, 2018, now Pat. No. 11,160,029.

(Continued)

(51) Int. Cl.
*H04W 52/14* (2009.01)
*H04L 5/00* (2006.01)

(Continued)

(52) U.S. Cl.
CPC ......... *H04W 52/146* (2013.01); *H04L 5/0048* (2013.01); *H04W 24/08* (2013.01); *H04W 52/242* (2013.01); *H04W 72/0406* (2013.01)

(58) Field of Classification Search
CPC ..... H04W 52/00; H04W 52/04; H04W 52/06; H04W 52/08; H04W 52/14;
(Continued)

(56) References Cited

U.S. PATENT DOCUMENTS 7,548,517 B2 * 6/2009 Kyperountas ......... G01S 5/0289
342/453
9,392,589 B2 7/2016 Kim et al.
(Continued)

FOREIGN PATENT DOCUMENTS

KR 1020140054082 5/2014
KR 1020160131944 11/2016

OTHER PUBLICATIONS

Huawei, HiSilicon, "CSI Acquisition Framework for Massive MIMO in New Radio," R1-164374, 3GPP TSG RAN WG1 Meeting #85, Nanjing, China, dated May 23-27, 2016, 6 pages.
(Continued)

*Primary Examiner* — Md K Talukder
(74) *Attorney, Agent, or Firm* — Fish & Richardson P.C.

(57) ABSTRACT

A method for uplink (UL) power control of a User Equipment (UE) in a wireless communication system according to one embodiment of the present invention comprises receiving a Downlink (DL) Reference Signal (RS); measuring DL path-loss by using the DL RS; determining transmission power for an UL channel by using the measured path-loss; and transmitting the UL channel, wherein the DL RS used for determining the transmission power for the UL channel is determined based on configuration information indicated by a base station.

15 Claims, 8 Drawing Sheets

Related U.S. Application Data

(60) Provisional application No. 62/593,163, filed on Nov. 30, 2017, provisional application No. 62/559,627, filed on Sep. 17, 2017, provisional application No. 62/501,706, filed on May 4, 2017, provisional application No. 62/442,382, filed on Jan. 4, 2017.

(51) Int. Cl.
 *H04W 24/08* (2009.01)
 *H04W 52/24* (2009.01)
 *H04W 72/04* (2023.01)

(58) Field of Classification Search
 CPC . H04W 52/146; H04W 52/18; H04W 52/242; H04W 52/325; H04W 52/248; H04W 52/24; H04W 52/241; H04W 52/245; H04W 52/246; H04W 52/34; H04W 52/367; H04W 72/0413; H04W 72/042
 USPC ........................................................ 455/522
 See application file for complete search history.

(56) References Cited

U.S. PATENT DOCUMENTS

| | | | |
|---|---|---|---|
| 11,160,029 B2* | 10/2021 | Park | H04W 52/242 |
| 2012/0202477 A1* | 8/2012 | Eriksson | H04B 17/21 |
| | | | 455/419 |
| 2014/0185481 A1 | 7/2014 | Seol et al. | |
| 2014/0307643 A1 | 10/2014 | Froberg Olsson et al. | |
| 2015/0085787 A1 | 3/2015 | Ouchi | |
| 2015/0304960 A1* | 10/2015 | Yang | H04W 52/0258 |
| | | | 370/252 |
| 2022/0330167 A1* | 10/2022 | Chen | H04W 52/146 |

OTHER PUBLICATIONS

National Instruments, "Overview of Massive MIMO for NR," R1-164117, 3GPP TSG RAN WG1 Meeting #85, Nanjing, China, dated May 23-27, 2016, 8 pages.

PCT International Search Report in International Appln. No. PCT/KR2018/000168, dated Apr. 24, 2018, 5 pages (with English translation).

* cited by examiner

METHOD FOR CONTROLLING UPLINK POWER BASED ON DOWNLINK PATH LOSS AND CONFIGURATION INDICATED BY BASE STATION

CROSS-REFERENCE TO RELATED APPLICATIONS

This application is a continuation of U.S. application Ser. No. 16/064,321, filed on Jul. 12, 2018, which is a National Stage application under 35 U.S.C. § 371 of International Application No. PCT/KR2018/000168, filed on Jan. 4, 2018, which claims the benefit of U.S. Provisional Application No. 62/593,163, filed on Nov. 30, 2017, U.S. Provisional Application No. 62/559,627, filed on Sep. 17, 2017, U.S. Provisional Application No. 62/501,706, filed on May 4, 2017, and U.S. Provisional Application No. 62/442,382, filed on Jan. 4, 2017. The disclosures of the prior applications are incorporated by reference in their entirety.

TECHNICAL FIELD

The present invention relates to a wireless communication system and more particularly, a method for uplink power control and a device for the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present invention is to provide a procedure for uplink power control which may be applied to a new wireless communication system.

Also, since the new wireless communication system does not define a cell-specific reference signal for pathloss estimation as in the LTE system, an object of the present invention is to provide a new downlink reference signal for pathloss estimation.

Also, an object of the present invention is to provide an efficient method for a base station to configure/indicate a downlink reference signal which is a basis for determining uplink channel transmission power.

Technical objects to be achieved by the present invention are not limited to those described above. Other technical objects of the present invention may also be clearly understood from the descriptions given below by those skilled in the art to which the present invention belongs.

A method for uplink (UL) power control of a User Equipment (UE) in a wireless communication system according to one embodiment of the present invention comprises receiving a Downlink (DL) Reference Signal (RS); measuring DL path-loss by using the DL RS; determining transmission power for an UL channel by using the measured path-loss; and transmitting the UL channel, wherein the DL RS used for determining the transmission power for the UL channel may be determined based on configuration information indicated by a base station.

Also, the UL channel may correspond to a Physical Uplink Control Channel (PUCCH) or a Physical Uplink Shared Channel (PUSCH).

Also, the DL RS may correspond to a Channel State Information (CSI)-RS and/or a Synchronization Signal/Sequence (SS) block.

Also, the configuration information may be indicated through Radio Resource Control (RRC) signaling.

Also, the configuration information may include the number of the DL RS and/or index of the DL RS.

Also, when the DL RS is determined as a specific DL RS indicated through the configuration information, the specific DL RS may be updated through Medium Access Control (MAC) Control Element (CE) signaling.

Also, when a plurality of candidate DL RSs are indicated through the configuration information, the DL RS may be determined as a specific DL RS indicated through Medium Access Control (MAC) Control Element (CE) signaling among the candidate DL RSs.

Also, when there exists a plurality of the UL channels to be transmitted, the DL RS may be determined independently for each UL channel resource configuration mapped to each of the plurality of the UL channels.

Also, when at least one candidate DS RS is indicated through the configuration information, the DL RS may be determined as a specific candidate DL RS associated with each of the UL channel resource configurations.

Also, each of the UL channel resource configurations may be mutually associated with the at least one candidate DL RS based on an index of each of the UL channel resource configurations and an index of the at least one candidate DL RS.

Also, the DL RS may be determined as a specific DL RS associated with a Control Resource SET (CORESET) set for the UE through the configuration information.

Also, when transmission of the UL channel is triggered by a DL channel transmitted through the CORESET, the specific DL RS may correspond to the CSI-RS and/or the SS block Quasi-co-Located (QCLed) with a DL channel transmitted through the CORESET.

Also, when at least one candidate DL RS is indicated through the configuration information, the specific DL RS may be determined as the DL RS only when the specific DL RS is included in the at least one candidate DL RS.

Also, when a beam change indication for the base station is received, the method for power control may further comprise increasing transmission power of the determined UL channel as much as the amount of preconfigured power.

A User Equipment (UE) performing Uplink (UL) power control in a wireless communication system according to another embodiment of the present invention comprises a Radio Frequency (RF) unit for transmitting and receiving a radio signal; and a processor for controlling the RF unit, wherein the processor is configured to receive a Downlink (DL) Reference Signal (RS); measure DL path-loss by using the DL RS; determine transmission power of a UL channel by using the measured path-loss; and transmit the UL channel, wherein the DL RS used for determining the transmission power for the UL channel may be determined based on configuration information indicated by a base station.

According to one embodiment of the present invention, since an estimate of pathloss due to a downlink reference signal is used for determining transmission power of an uplink channel, transmission efficiency of an uplink channel is improved.

Also, according to one embodiment of the present invention, since a downlink reference signal used for determining transmission power of an uplink channel is configured/indicated by a base station, ambiguity about which downlink reference signal is to be used by a UE is removed.

The advantageous effect that may be achieved from the present invention are not limited to those described above, and it should be clearly understood by those skilled in the art to which the present invention belongs that other effects not mentioned in this document may be achieved from the descriptions given below.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Figures 1A, 1B:
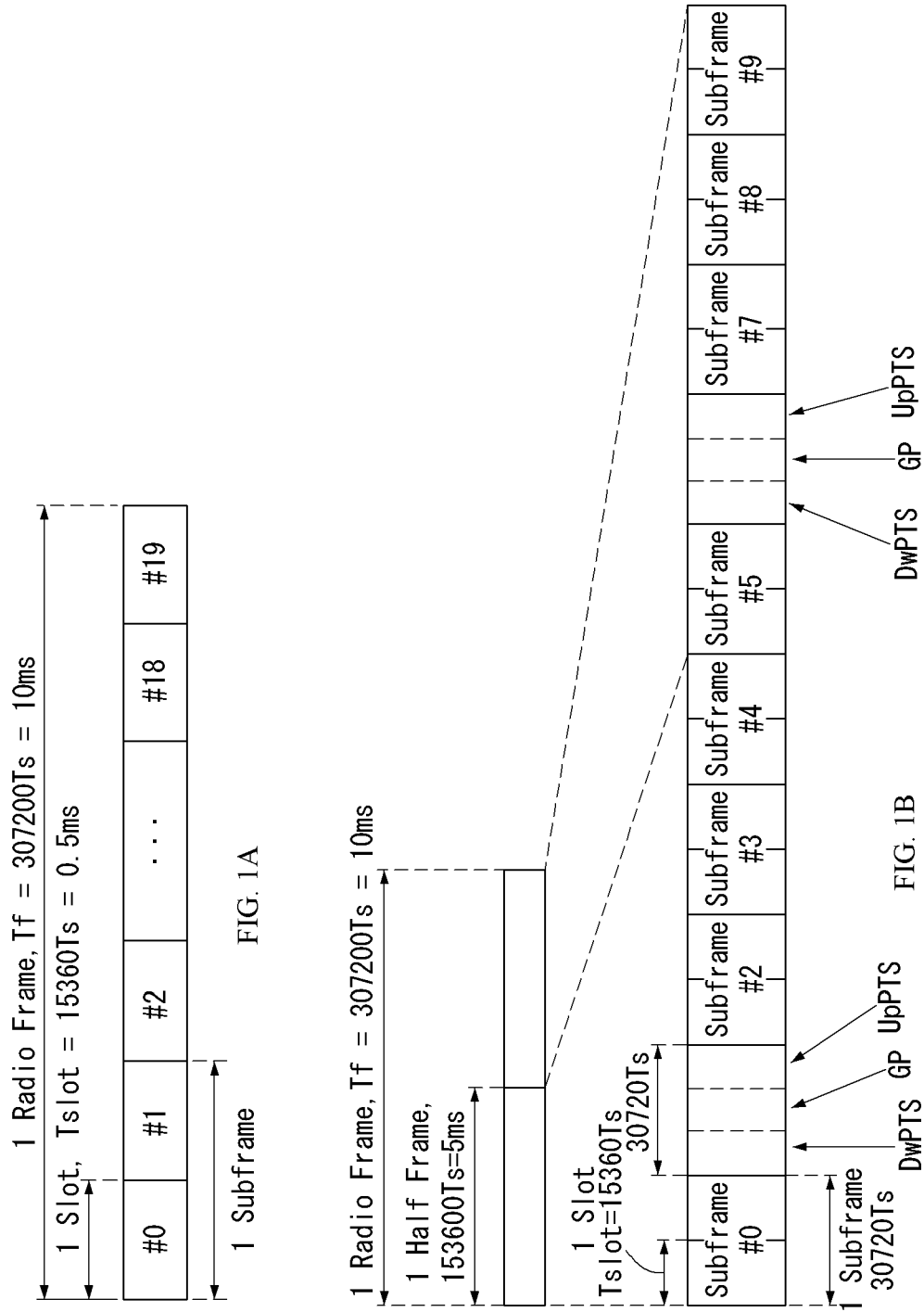
FIGS. 1A and 1B show the structure of a radio frame in a wireless communication system to which an embodiment of the present invention may be applied.

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), g-NodeB (gNB), New RAT (NR) or 5G-NodeB Remote radio head (RRH), transmission point (TP), reception point (RP), transmission/reception point (TRP), relay. Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General system to which the present invention may be applied

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1A illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | | |
| 5 | $6592 \cdot T_S$ | $4384 \cdot T_S$ | $5120 \cdot T_S$ | $20480 \cdot T_S$ | $4384 \cdot T_S$ | $5120 \cdot T_S$ |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

The structure of a radio frame is only one example. The number of subcarriers included in a radio frame or the number of slots included in a subframe and the number of OFDM symbols included in a slot may be changed in various ways.

Figure 2:
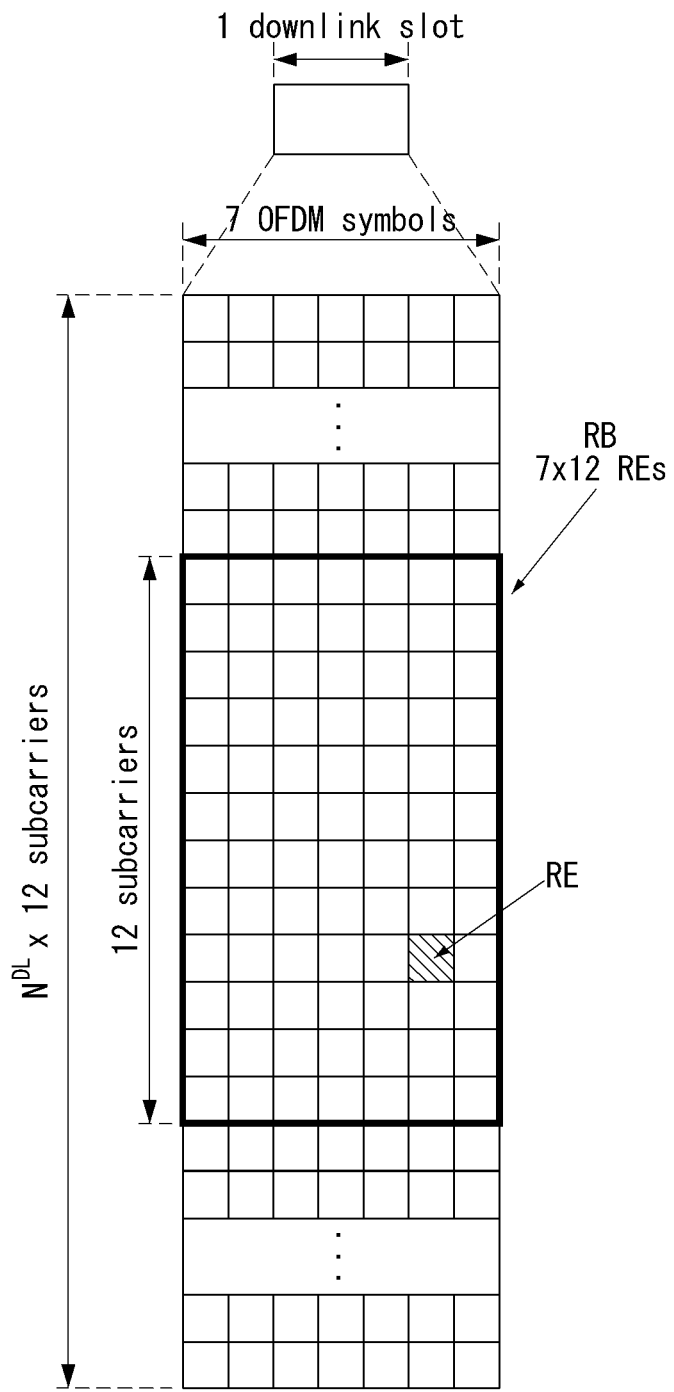
FIG. 2 is a diagram illustrating a resource grid for one downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

Figure 3:
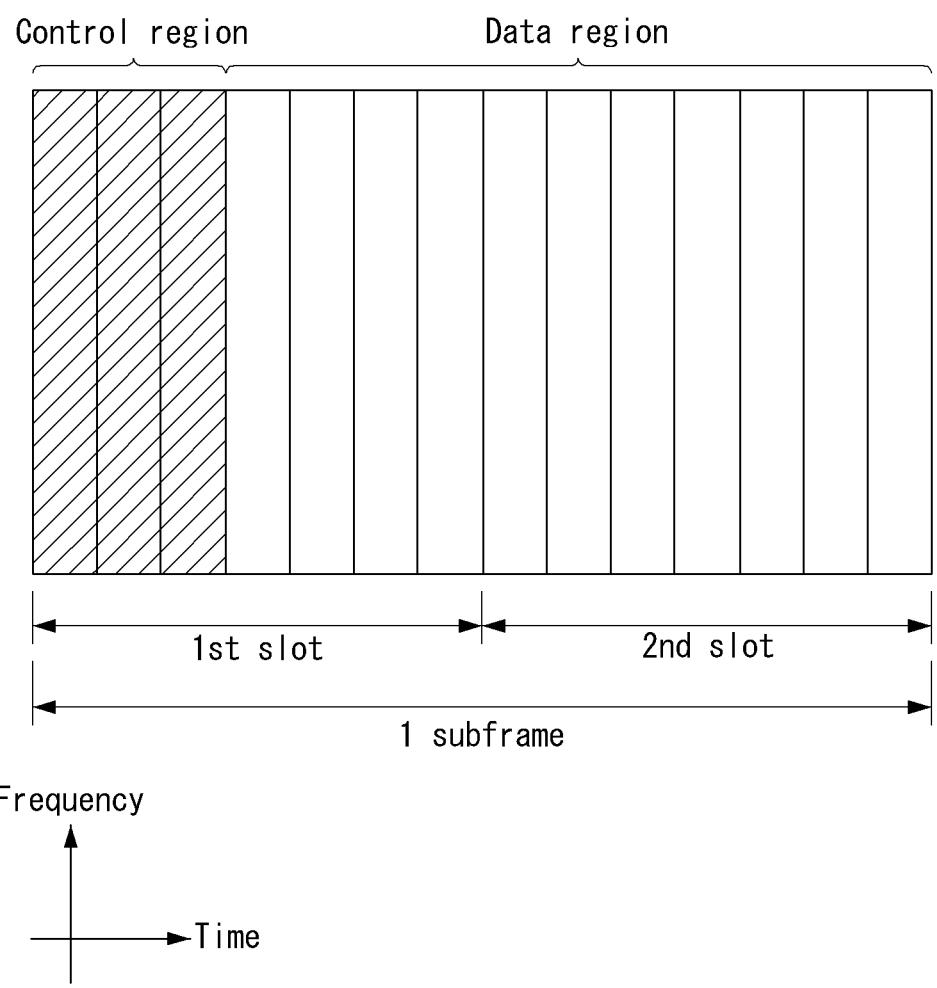
FIG. 3 shows the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
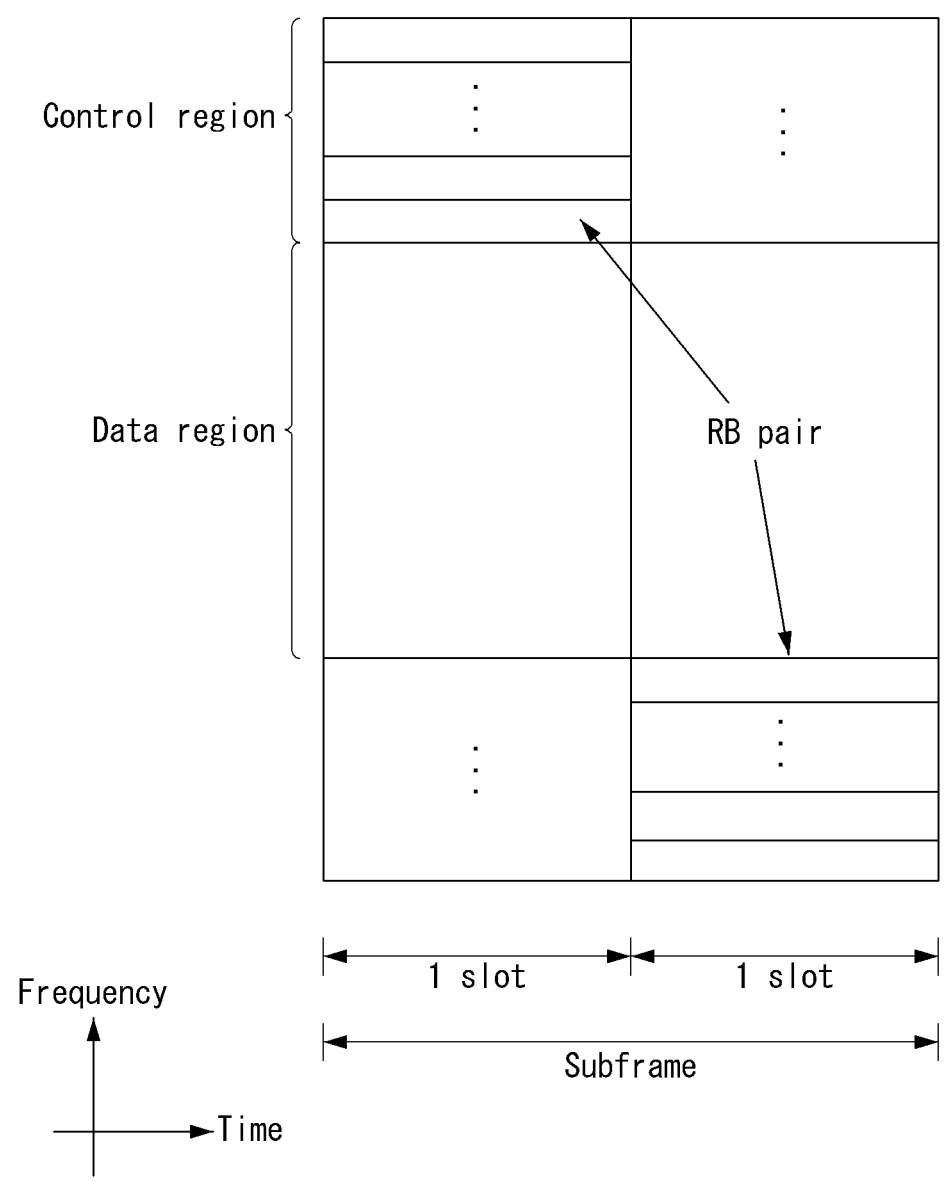
FIG. 4 shows the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is referred to as 'new RAT (NR)'.

Self-Contained Subframe Structure

Figure 5:
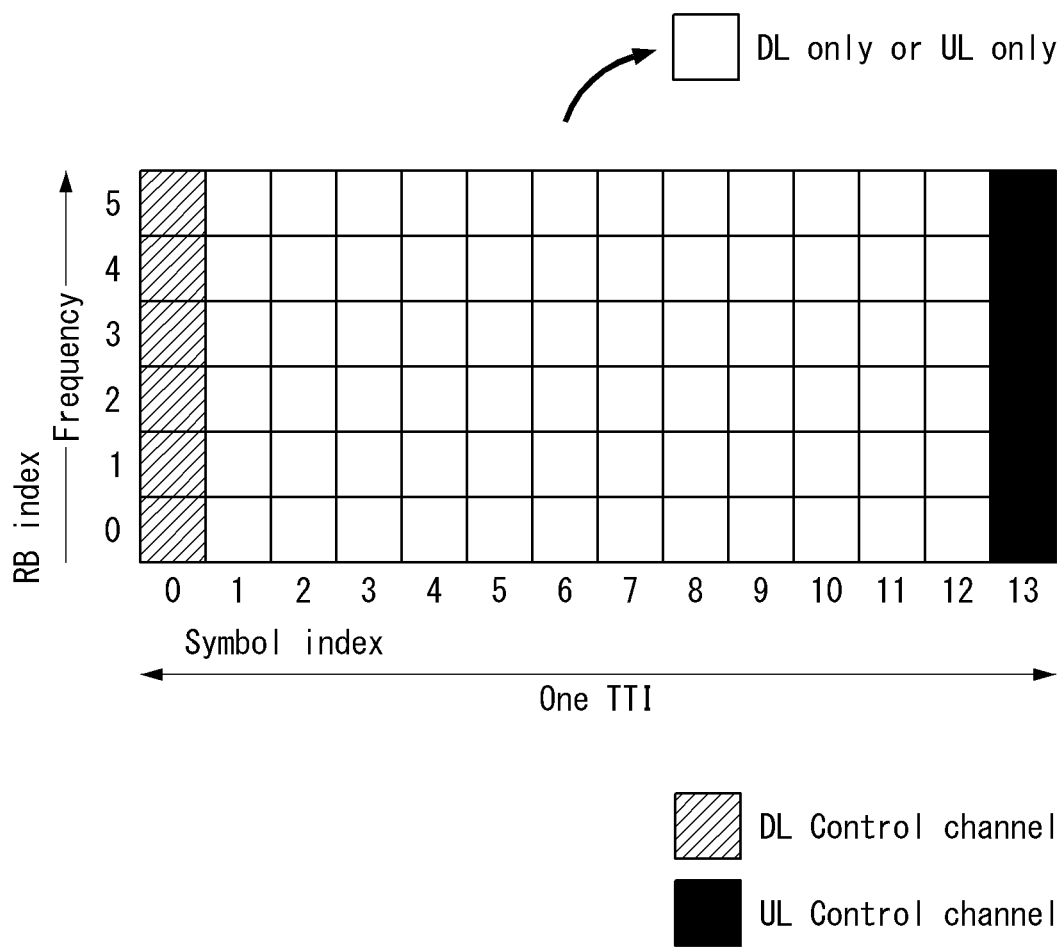
FIG. 5 illustrates a self-contained subframe structure to which the present invention may be applied.

FIG. 5 illustrates a self-contained subframe structure to which the present invention may be applied.

In TDD system, in order to minimize data transmission delay, the self-contained subframe structure as shown in FIG. 5 has been considered in 5 Generation new RAT. The shaded area in FIG. 5 shows a downlink control region, and the dark area shows an uplink control region. In addition, the area not marked in FIG. 5 may be used for a downlink (DL) data transmission or an uplink (UL) data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the delay till the last data forwarding may be minimized.

As an example of the self-contained subframe structure which may be configured/setup in a system operating based on New RAT, the following at least four subframe types may be considered. Hereinafter, the durations existed in each of the subframe types are numerated in time sequence.

1) DL control duration+DL data duration+guard period (GP)+UL control duration

2) DL control duration+DL data duration

3) DL data duration+GP+UL control duration+UL control duration

4) DL data duration+GP+UL control duration

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 100 antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

Figure 6:
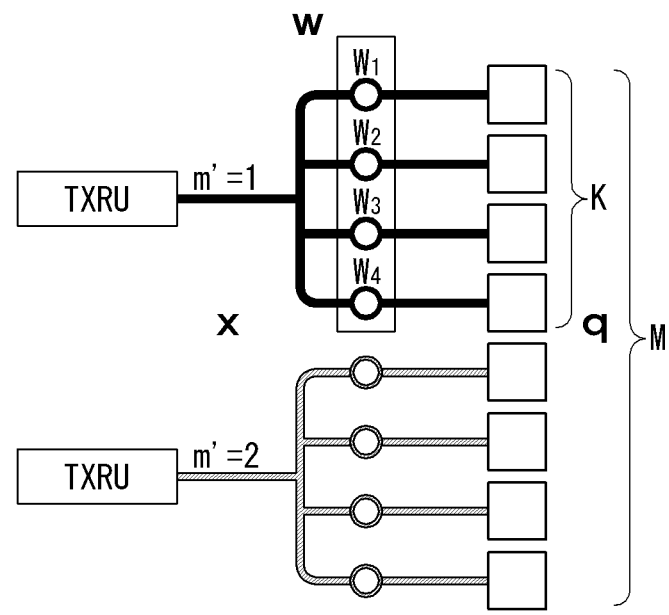
FIG. 6 exemplifies a sub-array partition model, which is a first TXRU virtualization model option.
Figure 7:
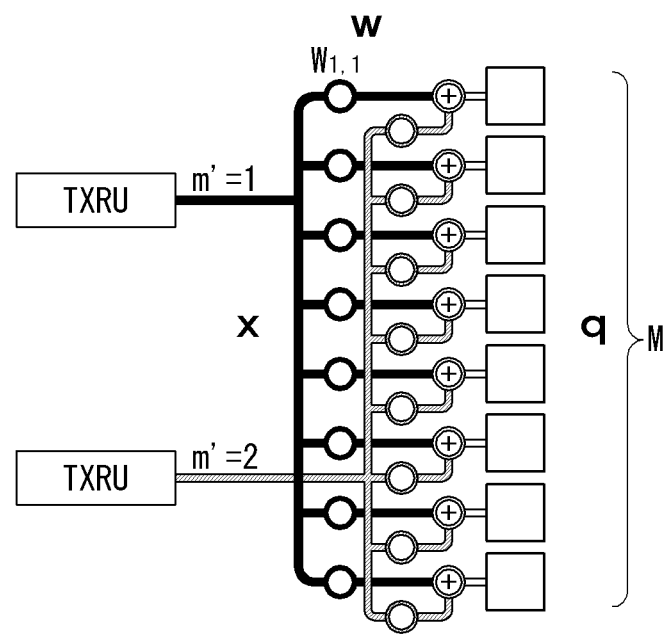
FIG. 7 exemplifies a full-connection model, which is a second TXRU virtualization model option.

FIGS. 6 and 7 illustrate a representative connection scheme between a TXRU and an antenna element. More particularly, FIG. 6 exemplifies a sub-array partition model, which is a first TXRU virtualization model option and FIG. 7 exemplifies a full-connection model, which is a second TXRU virtualization model option. In FIGS. 6 and 7, TXRU virtualization model represents a relation between an output signal of a TXRU and an output signal of an antenna element.

As shown in FIG. 6, in the case of the virtualization model in which a TXRU is connected to a sub-array, an antenna element is connected to only a single TXRU. Different from this, in the case of the virtualization model in which a TXRU is connected to all antenna elements, an antenna element is connected to all TXRUs. In these drawings, W represents a phase vector which is multiplied by an analog phase shifter. That is, a direction of analog beamforming is determined by W. Here, mapping between CSI-RS antenna ports and TXRUs may be 1 to 1 (1:1) or 1 to many (1:N).

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

In a mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix index (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

In 3GPP LTE(-A) system, it is defined that a UE reports CSI to a BS. Here, the CSI is commonly called for the information that may represent a quality of a radio channel (or also referred to as a link) established between a UE and an antenna port. For example, the CSI may correspond to a rank indicator (RI), a precoding matrix indicator (PMI), and/or a channel quality indicator (CQI), and the like. Here, RI represents rank information of a channel, and this may mean the number of streams that a UE receives through the same time-frequency resource. Since RI is determined with being dependent upon long-term fading of a channel, the RI is fed back from a UE to a BS with a period longer than CQI, generally. PMI is a value that reflects a channel space property, and represents a precoding index that a UE prefers based on a metric such as SINR. CQI is a value that represents signal strength, and means a reception SINR that is obtainable when a BS uses the PMI, generally.

In 3GPP LTE(-A) system, a BS may setup a plurality of CSI processes to a UE, and may receive CSI report for each process. Here, the CSI process may include CSI-RS for signal quality measurement from a BS and CSI-interference measurement (CSI-IM) resource for interference measurement.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

Figure 8A:
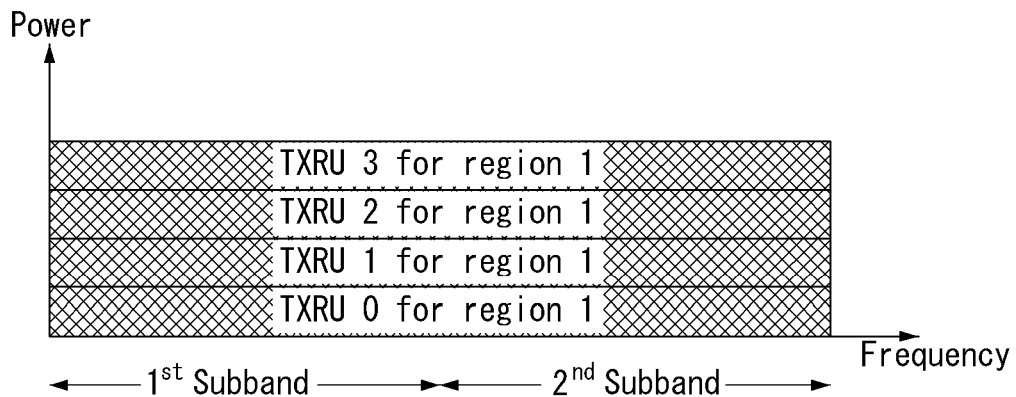
FIGS. 8A through 8C illustrate a service area for each TXRU.
Figure 8B:
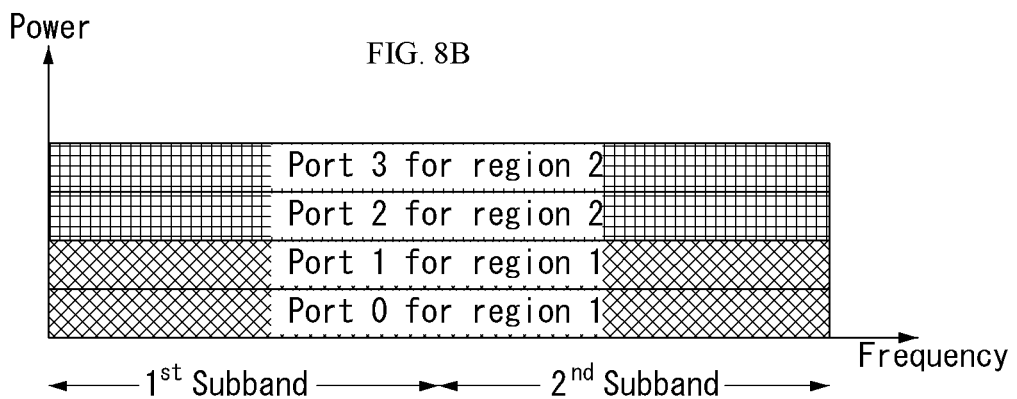
Figure 8C:
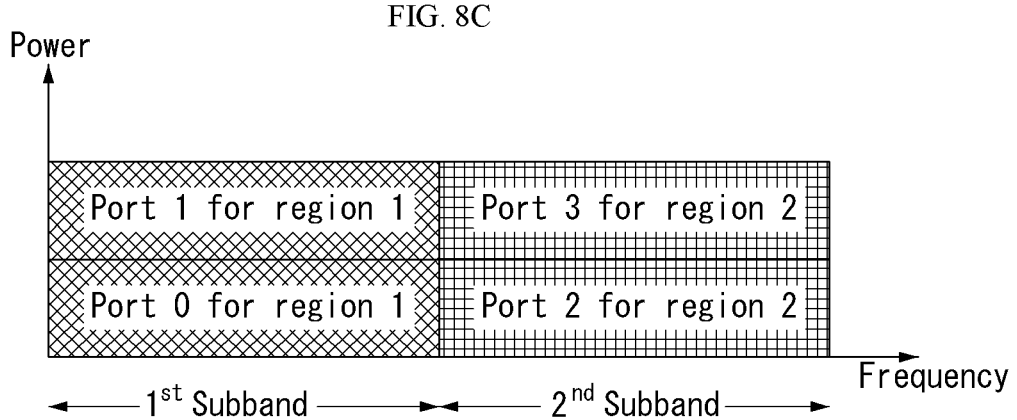

FIGS. 8A through 8C illustrates reference signal patterns mapped to downlink resource block pairs in a wireless communication system to which the present invention may be applied.

Referring to FIGS. 8A through 8C, a downlink resource block pair, a unit in which a reference signal is mapped may be represented in the form of one subframe in a time domain X 12 subcarriers in a frequency domain. That is, in a time axis (an x axis), one resource block pair has a length of 14 OFDM symbols in the case of a normal cyclic prefix (CP) (in FIG. 7(a)) and has a length of 12 OFDM symbols in the case of an extended cyclic prefix (CP) (FIG. 7(b)). In the resource block lattice, resource elements (REs) indicated by '0', '1', '2', and '3' mean the locations of the CRSs of antenna port indices '0', '1', '2', and '3', respectively, and REs indicated by D' mean the location of a DRS.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an evolved and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, both of the aforementioned RS for channel measurement and the aforementioned RS for data demodulation should be designed.

One of important factors considered in designing an LTE-A system is backward compatibility, that is, that an LTE UE should operate properly also in the LTE-A system, which should be supported by the system. From an RS transmission aspect, in the time-frequency domain in which a CRS defined in LTE is transmitted in a full band every subframe, RSs for a maximum of eight transmission antenna ports should be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement purpose for the selection of MCS or a PMI (channel state information-RS, channel state indication-RS (CSI-RS), etc.) and an RS for the demodulation of data transmitted through eight transmission antennas (data demodulation-RS (DM-RS)).

The CSI-RS for the channel measurement purpose is characterized in that it is designed for a purpose focused on channel measurement unlike the existing CRS used for purposes of measurement, such as channel measurement and handover, and for data demodulation. Furthermore, the CSI-RS may also be used for a purpose of measurement, such as handover. The CSI-RS does not need to be transmitted every subframe unlike the CRS because it is transmitted for a purpose of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, in the case that RSs for a maximum of eight transmission antennas are transmitted in a full band in every subframe using the same method as the CRS in the existing LTE, RS overhead is excessively increased. Accordingly, in the LTE-A system, an RS has been separated into the CSI-RS of the CSI measurement purpose of the selection of MCS or a PMI and the DM-RS for data demodulation, and thus the two RSs have been added. The CSI-RS may also be used for a purpose, such as RRM measurement, but has been designed for a main purpose of the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE should be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB should notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined only for a subcarrier interval $\Delta f=15$ kHz.

RS Virtualization

In mmW band, a PDSCH transmission is available only to a single analog beam direction on a time by analog beamforming. As a result, an eNB is able to transmit data only to a small number of UEs in a specific direction. Accordingly, on occasion demands, analog beam direction is differently configured for each antenna port, and a data transmission may be performed to a plurality of UEs in several analog beam directions simultaneously.

Hereinafter, four sub-arrays are formed by dividing 256 antenna elements into four equal parts, and an exemplary structure in which a TXRU is connected to each sub-array shown in FIGS. 8A through 8C is described mainly.

FIGS. 8A through 8C is a diagram illustrating a service area for each TXRU.

When each sub-array includes total 64 (8×8) antenna elements in 2-dimensional array shape, a region corresponding to a horizontal angle area of 15 degrees and a vertical angle area of 15 degrees may be covered by specific analog beamforming. That is, a region in which an eNB is needed to serve is divided into a plurality of areas, and each area is served at a time. In the following description, it is assumed that CSI-RS antenna port and TXRU are mapped in 1-to-1 manner. Accordingly, an antenna port and a TXRU may have the same meaning in the following description.

As shown in an example of FIG. 8A, in the case that all TXRUs (antenna port, sub-array) have the same analog beamforming direction, the throughput of the corresponding region may be increased by forming a digital beam having higher resolution. In addition, the throughput of the corresponding region may be increased by increasing rank of transmission data to the corresponding region.

As shown in FIG. 8B, in the case that each TXRU (antenna port, sub-array) has different analog beamforming direction, a simultaneous data transmission becomes available in a corresponding subframe (SF) to UEs distributed in wider area. For example, among four antenna ports, two of them are used for a PDSCH transmission to UE1 in area 1 and the remaining two of them are used for a PDSCH transmission to UE2 in area 2.

FIG. 8B shows an example that PDSCH 1 transmitted to UE1 and PDSCH 2 transmitted to UE2 are Spatial Division Multiplexed (SDM). Different from this, FIG. 8C shows an example that PDSCH 1 transmitted to UE1 and PDSCH 2 transmitted to UE2 may be transmitted by being Frequency Division Multiplexed (FDM).

Between the scheme of serving an area by using all antenna ports and the scheme of serving several areas simultaneously by dividing antenna ports, in order to maximize cell throughput, a preferred scheme may be changed depending on a RANK and an MCS served to a UE. In addition, a preferred scheme may also be changed depending on an amount of data to be transmitted to each UE.

An eNB calculates cell throughput or scheduling metric that may be obtained when serving an area by using all antenna ports, and calculates cell throughput or scheduling metric that may be obtained when serving two areas by dividing antenna ports. The eNB compares the cell throughput or the scheduling metric that may be obtained through each scheme, and selects a final transmission scheme. Consequently, the number of antenna ports participated in a PDSCH transmission is changed for each SF (SF-by-SF). In order for an eNB to calculate a transmission MCS of a PDSCH according to the number of antenna ports and reflect it to scheduling algorithm, a CSI feedback from a UE proper to it may be requested.

Beam reference signal (BRS) and Beam refinement reference signal (BRRS) BRSs may be transmitted in at least one antenna port p={0, 1, . . . , 7}. BRS sequence $r_l(m)$ may be defined as Equation 1 below.

$$r_l(m) = \frac{1}{\sqrt{2}}(1-2\cdot c(2m)) + j\frac{1}{\sqrt{2}}(1-2\cdot c(2m+1)), \quad \text{[Equation 1]}$$

$$m = 0, 1, \ldots, 8\cdot(N_{RB}^{max,DL} - 18) - 1$$

In Equation 1, l=0, 1, . . . , 13 may represents an OFDM symbol number. In addition, c(i) represents a pseudo-random sequence generator, and may be initialized by Equation 2 on a starting point of each OFDM symbol.

$$C_{init} = 2^{10}\cdot(7\cdot(n_s+1)+l'+1)\cdot(2\cdot N_{ID}^{cell}+1)+2\cdot N_{ID}^{cell}+1, \quad \text{[Equation 2]}$$

$$n_s = \left\lfloor\frac{l}{7}\right\rfloor,$$

$$l' = l \bmod 7$$

BRRS may be transmitted in maximum eight antenna ports p=600, . . . , 607. A transmission and a reception of BRRS may be dynamically scheduled in a downlink resource allocation in xPDCCH.

BRRS sequence $r_{l,n_s}(m)$ may be defined as Equation 3 below.

$$r_{l,n_s}(m) = \frac{1}{\sqrt{2}}(1-2c(2m)) + j\frac{1}{\sqrt{2}}(1-2c(2m+1)), \quad \text{[Equation 3]}$$

$$m = 0, 1, \ldots, \left\lfloor\frac{3}{8}N_{RB}^{max,DL}\right\rfloor - 1$$

In Equation 3, ns represents a slot number in a radio frame, l represents an OFDM symbol number in the slot, and c(n) represents a pseudo-random sequence. The pseudo-random sequence generator may be initialized by Equation 4 on a starting point of each OFDM symbol.

$$c_{init} = 2^{10}(7(\bar{n}_s+1)+l+1)\cdot(2N_{ID}^{BRRS}+1)+2N_{ID}^{BRRS}+1 \quad \text{[Equation 4]}$$

$$\bar{n}_s = n_s \bmod 20$$

In Equation 4, may $N_{ID}^{BRRS}$ be set to a UE through RRC (Radio Resource Control) signaling.

BRS may be transmitted to each subframe and may be transmitted in a different analog beam direction for each port. BRS may be used by an eNB to determine an approximate analog beam direction to a UE. If an approximate analog beam direction toward a UE is determined based on the BRS, the eNB may refine the analog beam direction toward the UE more accurately by transmitting BRRS in more precise/finer directions within a given analog beam direction range.

As described above, the term for a reference signal used for determining an analog beam direction toward a UE is not limited to the aforementioned BRS or BRRS and may be replaced with/referred to as various other reference signals which may be used for performing the same function. For example, BRS may be replaced with/referred to as primary/first CSI-RS, Primary synchronization signal/sequence (PSS), Secondary synchronization signal/sequence (SSS), Synchronization Signal/Sequence (SS) block, NR-PSS, and/or NR-SSS; and BRRS may be replaced with/referred to as secondary/second CSI-RS.

PSS, SSS and/or PBCH may be transmitted within an 'SS block (SSB)'. An SS block does not exclude other signal. One or more SS block(s) may comprise an 'SS burst'. One or more SS burst(s) may comprise an 'SS burst set'. The number of SS bursts within an SS burst set may be finite.

DL Phase noise compensation reference signal (DL PCRS)

A PCRS associated with xPDSCH may be transmitted in antenna port P=60 or P=61 as it is signaled in a DCI format. The PCRS is existed only in the case that xPDSCH transmission is associated with a corresponding antenna port, and the PCRS in this case may be a valid reference for phase noise compensation. The PCRS may be transmitted only in physical resource blocks and symbols to which corresponding xPDSCH is mapped. The PCRS may be the same in all symbols that correspond to xPDSCH allocation.

For both of the antenna ports P=60, 61, PCRS sequence r(m) may be defined as Equation 5 below.

$$r(m) = \frac{1}{\sqrt{2}}(1-2\cdot c(2m)) + j\frac{1}{\sqrt{2}}(1-2\cdot c(2m+1)), \quad \text{[Equation 5]}$$

$$m = 0, 1, \ldots, \left\lfloor N_{RB}^{max,DL}/4\right\rfloor - 1$$

In Equation 5, c(i) represents pseudo-random sequence. The pseudo-random sequence generator may be initialized by Equation 6 on a starting point of each subframe.

$$c_{init} = (\lfloor n_s/2\rfloor+1)\cdot\left(2N_{ID}^{(n_{SCID})}+1\right)\cdot 2^{16}+n_{SCID} \quad \text{[Equation 6]}$$

In Equation 6, $n_{ID}^{(i)}$ may be determined as below when i=0, 1.

In the case that a value for $n_{ID}^{PCRS,i}$ is not provided by a higher layer, $n_{ID}^{(i)}=N_{ID}^{cell}$ Otherwise, $n_{ID}^{(i)}=n_{ID}^{PCRS,i}$ A value of n_SCID may be set to 0, unless it is particularly determined. In xPDSCH transmission, n_SCID may be provided by a DCI formation associated with xPDSCH transmission.

Beam Management Framework

The following DL Layer 1 (L1)/Layer 2 (L2) beam management procedures may be supported within one or more TRPs:

P-1 (procedure): P-1 may be used for enabling measurement of different TRP Tx beams by a UE to support selection of TRP transmission (Tx) beams/UE reception (Rx) beam(s). A typical case of TRP beamforming may include intra/inter-TRP Tx beam sweeping from a set of different beams (or which uses a set comprising different beams). A typical case of UE beamforming may include UE Rx beam sweeping from a set of different beams (or which uses a set of different beams). TRP Tx beams and UE Rx beams may be determined jointly or sequentially. When the beams are determined sequentially, for example, a TRP Tx beam is first determined, and a UE Tx beam may then be determined based on the determined TRP Tx beam.

P-2 (procedure): P-2 is used for enabling measurement of different TRP Tx beams by a UE to determine/change inter/intra-TRP Tx beam(s). In other words, since P-2 is intended to be used by a UE to determine optimal/relevant TRP Tx beam(s), different TRP Tx beams are measured (more specifically, an RS transmitted through different TRP Tx beams is measured), and repeated measurement of the same TRP Tx beam is not performed. Therefore, when P-2 is configured, a Tx beam to which an RS (for example, CSI-RS) resource is transmitted/mapped within the same/one RS resource set may differ for each resource. At this time, Rx beam set used for measurement of different TRP Tx beam(s) may be set to the same beam, which may correspond to the Rx beam determined/selected by P-3 described below.

The P-2 may be configured for a UE through RRC signaling. For example, P-2 may be configured/indicated for a UE as ResourceRep (or CSI-RS-ResourceRep) RRC parameter' is configured/indicated as 'off'. At this time, the ResourceRep RRC parameter' may correspond to an RRC parameter which indicates whether 'repetition is on/off'. If the 'ResourceRep RRC parameter' indicates 'repetition on' (namely the parameter is configured as on), the UE may assume that an eNB maintains a fixed Tx beam for each RS resource within the same RS set while if 'repetition off' is indicated (namely the parameter is configured as off), the UE may assume that the eNB does not maintain a fixed Tx beam for each RS resource within the same RS set. At this time, the ResourceRep RRC parameter when the RS is a CSI-RS may be referred to as 'CSI-RS-ResourceRep RRC parameter'. The CSI-RS-ResourceRep parameter associated with a CSI-RS resource set defines whether a repetition in conjunction with spatial domain transmission filter is ON/OFF (in particular, whether spatial domain transmission filter is the same) at gNB-side.

If the UE is configured with the higher-layer parameter CSI-RS-ResourceRep set to 'OFF' (namely if P-2 is configured), the UE may not assume that the CSI-RS resources within the resource set are transmitted with the same downlink spatial domain transmission filter and with the same number of ports in every symbol.

The P-2 may perform UE measurement on a smaller Tx beam set than P-1 (namely a smaller set of beams) for more precise beam refinement than P-1. Therefore, P-2 may be regarded as a special case of P-1.

P-3 (procedure): When a UE uses beamforming, P-3 is used for enabling (repeated) measurement of the same TRP Tx beam by the UE to determine/change a UE Rx beam. In other words, since P-3 is intended to be used by a UE to determine an optimal/relevant Rx beam, the same TRP 'Tx' beam may be measured/received 'repeatedly' by using a different 'Rx' beam (more specifically, an RS transmitted through the same TRP Tx beams may be measured by using a different Rx beam). At this time, the same TRP 'Tx' beam measured repeatedly may be a Tx beam determined/selected beforehand through the P-2 procedure. Therefore, when P-3 is configured, a Tx beam to which RS (for example, CSI-RS) resources are transmitted/mapped within the same RS resource set may be the same for each resource.

The P-3 may be configured for a UE through RRC signaling. For example, the P-3 may be configured/indicated for a UE as 'ResourceRep (or CSI-RS-ResourceRep) RRC parameter' is configured/indicated as cony.

If the UE is configured with the higher-layer parameter CSI-RS-ResourceRep set to 'ON', the UE may assume that the CSI-RS resources within the resource set are transmitted through the same downlink spatial domain transmission filter, where the CSI-RS resources within the resource set are transmitted in different OFDM symbols. Also, the UE is not expected to receive different periodicity for all of the CSI-RS resources within the set.

To achieve simultaneous change of the TRP Tx beam and UE Rx beam, the P-2 and P-3 procedures may be performed jointly (or sequentially) and/or multiple times. The P-3 procedure may or may not have a physical layer procedure. Also, the P-3 may support management of multiple Tx/Rx beam pairs for a UE.

The aforementioned procedures may be applied over the whole frequency band and may be used for a single/multiple beams for each TRP.

In what follows, an UL beam management procedure will be described. An UL beam management procedure may be defined similarly to the DL beam management procedure above and may be largely divided into the following types:

U-1 (procedure): U-1 may be used for enabling TRP measurement of different UE Tx beams to support selection of the UE Tx beam/TRP Rx beam. The U-1 procedure may correspond to the P-1 procedure described above.

U-2 (procedure): U-2 may be used for enabling TRP measurement of different TRP Rx beams to change/select inter/intra-TRP Rx beam(s). The U-2 procedure may correspond to the P-2 procedure described above.

U-3 (procedure): When a UE uses beamforming, U-3 may be used for enabling (repetitive) TRP measurement of the same TRP Rx beam to change UE Tx beams. The U-3 may correspond to the P-3 procedure described above.

With regard to these procedures, an indication of various Tx/Rx beam matching/correspondence-related information may be supported.

UL beam management may be performed based on the following channel/RS.

Physical Random Access Channel (PRACH)
Sounding Reference Signal (SRS)
DM-RS

A TRP and a UE may have Tx/Rx beam correspondence/matching. Or the TRP may not have Tx/Rx beam correspondence/matching and/or the UE may not have Tx/Rx beam correspondence/matching.

A CSI-RS may support DL Tx beam sweeping and UE Rx beam sweeping. At this time, the CSI-RS may be used for the P-1, P-2, and P-3 procedures.

An NR CSI-RS may support the following mapping structure:

Np CSI-RS port(s) may be mapped to each (sub) time unit. The same CSI-RS antenna ports may be mapped across (sub) time units. Here, the "time unit" refers to OFDM symbols where n≥1 in a configured/reference numerology. The OFDM symbols comprising a time unit may be consecutive or inconsecutive in the time domain. Methods for port multiplexing may include FDM, TDM, CDM, or various combinations thereof.

Each time unit may be partitioned into sub-time units. Partitioning methods may include, for example, TDM, Interleaved FDMA (IFDMA), and an OFDM symbol-level partitioning method, where the OFDM symbol has an OFDM symbol length the same as or shorter (namely larger subcarrier spacing) than the reference OFDM symbol length (subcarrier spacing); and other methods in addition thereto are also included.

The mapping structure may be used for supporting multiple panels/Tx chains.

The following CSI-RS mapping options may be available for Tx and Rx beam sweeping:

1. Option 1: The Tx beam(s) are the same across sub-time units within each time unit. The Tx beam(s) are different across time units.

2. Option 2: The Tx beam(s) are different across sub-time units within each time unit. The Tx beam(s) are the same across time units.

3. Option 3 (a combination of Option 1 and Option 2): within one time unit, Tx beam(s) are the same across sub-time units. Tx beam(s) within another time unit are different across sub-time units. In terms of the number and period, different time units may be combined together.

Only one of Tx sweeping and Rx sweeping may be available. The mapping structure above may be configured by a composition of one or more CSI-RS resources.

UL Pathloss control (PC) in the New RAT (NR)

In designing UL PC, the following factors need to be considered.

There is no cell-specific reference signal for estimation of pathloss as in the LTE system.
Beam-based transmission/reception
Analog beamforming in the eNB/UE
Multi-beam/multi-stream transmission
Multi-numerology
Inter-TRP information exchange
Dynamic TDD As a starting point of UL PC, a design as shown below may be taken into account:

Fractional power control of the LTE as a framework
DL RS for pathloss measurement (for example, an RS in the DL beam management P-1, P-2, and P-3 based on a multiple or single beam scenario)
Separate PC settings for UL control and data channel Furthermore, UL PC may be designed from the following aspects:

Numerology-specific parameter setting
Separate PC settings for multi-beam/multi-stream UL In the case of NR-PUSCH which targets at least enhanced mobile broadband (eMBB):

Open-loop power control based on pathloss estimate may be supported. Pathloss may be estimated by using a DL RS for measurement and/or fractional power control may be supported. At this time, which DL RS(s) (at this time, beamforming may be applied to the RS) are used for measurement may be indicated implicitly/explicitly by an eNB, which will be described in detail below.

And/or closed loop power control based on network (NW) signaling may be supported. At this time, dynamic UL-power adjustment may be taken into account.

Furthermore, numerology-specific power control (for example, numerology-specific power control parameters), beam-specific power control parameters, power control for other RSs and physical channels, power control with respect to the grant without involving PUSCH if supported, and/or power control for each layer (group) may be taken into account for UL PC.

New functions such as OFDM-based UL transmission and single symbol UL control channel are considered for adoption in the design of the NR system. In what follows, based on what has been described above, an UL power control procedure in the NR will be described, which includes basic components such as pathloss compensation, power offset, transmit power control (TPC) command, and some add-on functions.

1. Basic Parameters for UL Power Control 1-1. Pathloss Compensation

According to UL power control in the current LTE system, two types of pathloss compensation are considered. One is full pathloss compensation, and the other is fractional pathloss compensation. In the NR system, after a UE measures reference signal received power (RSRP) by using a specific RS type, pathloss between the UE and its associated gNB may be derived by using the (upper-layer filtered) RSRP.

The UL transmission power from the UE may be fully or partially compensated by taking into account estimated pathloss. First, full pathloss compensation may maximize fairness among cell-edge UEs. In other words, power received from the cell-edge UE by the gNB side may be comparable to the power received from a cell-center UE. On the other hand, if fractional pathloss compensation is used, the power received from a cell-center UE by the gNB side may be much higher than the power received from the cell-edge UE. While the pathloss of the cell-edge UE may be compensated by adjusting other power parameters or offsets so that the power received from the cell-edge UE may be controlled properly, the power received from the cell-center UE already provides a sufficient amount of power for most cases, and therefore may be redundant.

In the case of UL data channel transmission, such redundant/extra power may be used to improve spectral efficiency by applying a higher MCS level (for example, the cell-center UE may use a smaller number of PRBs for the same TB size). On the other hand, in the case of UL control channel transmission which uses a fixed amount of resources, since uplink control information (UCI) (payload) size does not depend on the UE position or channel state, it is unclear whether spectral efficiency is improved by using the redundant/extra power. Therefore, it is preferable to consider full compensation for power control of the UL control channel.

Also, in the case of fractional pathloss compensation for UL data channel transmission, a received power difference between the cell-center UE and the cell-edge UE may be adjusted by using the value of a fractional pathloss compensation factor, and this value may be varied according to the cell radius and target performance.

Considering the descriptions above as a whole, as a result, it is preferable to consider full pathloss compensation for power control of the UL control channel.

1-2. Power Offset Due to Data Rate

In general, to support a higher data rate, it is expected that more transmission power is needed. However, it is inefficient for power control of an UL data channel to use the fractional pathloss compensation and power offset (namely Delta_TF setting in the LTE) simultaneously depending on the data rate. Moreover, in the current LTE, this type of power offset is not supported for the rank higher than 2. Therefore, in the NR, it is necessary to consider supporting only fractional pathloss compensation without a power offset setting depending on data rate.

As a result, for power control of an UL data channel in the NR, it is necessary to consider supporting only fractional pathloss compensation without a power offset setting depending on data rate.

1-3. TPC Command

To compensate channel variations due to fast fading, TPC command may be used. While PUCCH power may be adjusted by TPC command signaled by DL assignment DCI in the current LTE, PUSCH (or SRS) power may be adjusted by TPC command signaled by UL grant DCI. Moreover, for UL transmission without involving associated DCI such as semi-persistent scheduling (SPS), periodic CSI, or SRS, the TPC command may be signaled to a specific UE group by using the DCI format 3/3A.

Two types of TPC procedures may be employed for updating UL transmission power; one is accumulative TPC, and the other is absolute TPC. Accumulative TPC relies on TPC values of relatively small step size and is well-suited for fine-tuning of UE transmission power. On the other hand, absolute TPC may be useful for boosting UE transmission power at once by using TPC values of relatively large step size.

As described above, by taking into account cell deployment, UL physical channel type (for example, control or data), and wireless channel condition, various methods may be proposed for the design of an UL power control procedure for NR from the aspect of pathloss compensation, power offset, and TPC command.

2. Additional Features for Power Control in the NR 2-1. Beamforming Operation

In the NR design, particularly in the high-frequency band (for example, above 6 GHz), it is necessary to consider introduction of analog (or hybrid) beamforming-based operation. With this analog beamforming, gNB Tx/Rx beam sweeping (for example, TDM among different gNB Tx/Rx beams) may be required not only for transmission of a DL common signal, synchronization signal (for example, PSS/SSS of the LTE) and/or broadcast system information (for example, physical broadcast channel (PBCH) of the LTE) but also for transmission of DL/UL control and data channels for servicing UEs located in different areas (or at different beam directions). In this case, it may be necessary to consider differentiation of power control parameters among different beams for a UE since power required for UL performance would be different from beam to beam for a UE.

As a result, since power required for UL performance would be different from beam to beam for a UE, differentiation of power control parameters among different beams for the UE may need to be taken into consideration.

However, in the case of accumulative TPC procedure, a further study is needed to determine whether PC parameter separation for each beam is better than a common accumulative TPC procedure regardless of beam change or switching. Taking into account the fact that the already stabilized transmit power levels are desired to remain as much as possible unless beam change occurs at different TRPs, the latter indicates that the accumulative TPC procedure is not reset even if a serving beam is changed by a beam management procedure. Since there may exist a configurable additional power offset to be applied to the TPC accumulation process whenever beam change or switching occurs within the same TRP for each targeted service requiring higher reliability such as URLLC and enhanced Vehicle-to-everything (eV2X), potential power control mismatch due to beam change/switching may be relieved. Also, this may be applied for retransmission for improving performance of HARQ which needs to be performed according to a proper higher-layer configuration provided by the gNB.

As a result, in the case of accumulative TPC procedure, according to a target service requiring high reliability (for example, URLLC and eV2X), it may be needed to take into account a configurable additional power offset which may be applied to a common TPC accumulation process whenever beam change or switching occurs within the same TRP.

To examine further in detail what are proposed by the present invention related to the descriptions above, the following issue related to the "beam specific power control parameters" needs to be considered among the specifics related to the UL PC:

How to perform transmit power control (TPC) of a transmit signal when, while a reception point (eNB) targeted by a transmission signal (when a UE performs UL transmission) is fixed, the Rx beam of the corresponding reception point is changed (by specific beam management) (and/or when the Tx beam of the corresponding transmission point (namely UE) is changed).

As one method to solve the aforementioned issue, TPC chain/procedure/parameter(s) are made to be configured independently for each specific beam so that power control may be applied/performed independently for each beam. This is so because when transmission/reception beam direction is changed, the optimal transmit power level may be changed for reasons such as changing of a reception interference environment.

However, independent configuration for each beam does not always guarantee optimal operation. This is so because since the reception point itself remains the same, but only Tx/Rx beams for the same transmission/reception point are changed, maintaining previous (stabilized) PC such as TPC accumulation as much as possible may be more advantageous in terms of performance. However, since optimal power control due to beam change/switching may be changed slightly, at least one method among those proposed below may be applied to improve reliability:

As described above, the TPC procedure due to beam change/switching is not allowed to be initialized for the same TRP. An example of a condition for determining TRPs as the same one may include "a case where beam change/switching occurs based on a CSI-RS configured in the form of a (sub-) time unit". More specifically, when the corresponding CSI-RS is configured as being intended for specific beam management or configured as a single CSI-RS resource and/or a plurality of CSI-RS resources but having the same TRP characteristics such that a specific group is configured for the plurality of CSI-RS resources, recognition of TRPs as the same one may be performed implicitly or explicitly (in other words, an indication which indicates whether they are the same TRP may be performed implicitly or explicitly). At this time, Quasi-co-Location (QCL) signaling may be used as an explicit indicator for recognizing the same TRP.

(In addition to the description above) when beam change/switching occurs within the same TRP as described above, a specific power offset value (P_offset_beam) to be added to the power control procedure (as a one-time value) may be configured by RRC configuration (and/or L2-level configuration such as Medium Access Control (MAC) Control Element (CE) and/or L1-level configuration such as DCI). In other words, in the case of TPC accumulation, if beam change/switching occurs, the UE may add P_offset_beam to the current power value (for the purpose of reliability). The P_offset_beam value may be configured by RRC configuration (and/or L2-level configuration such as MAC CE and/or L1-level configuration such as DCI) differently/independently for a specific service (for example, V2X, URLLC, and eMBB) or for each L1 parameter (for example, RNTI) corresponding to each service.

In the expression "beam change/switching" of the embodiment above, beam change and beam switching may connote operations distinguished from each other. For example, beam change may refer to the case where change of a serving beam occurs (namely a configured serving beam is changed to another beam) when only one serving beam is configured while beam switching may refer to the case where, when a plurality of serving beams are configured, dynamic beam switching occurs among configured serving beams (for example, (semi-) open-loop (OL) transmission based on beam cycling defined/configured by a specific (time-domain) pattern).

In the case of beam change, how a beam change command is delivered to a UE has to be considered first. More specifically, if a beam change command is delivered via an L1 signal (for example, DCI) or an L2 signal (for example, MAC CE), a power offset value having a large range/high resolution may be delivered within the corresponding signal/message. Also, a beam switching command may be delivered via an L1 signal (for example, DCI) or an L2 signal (for example, MAC CE), a (separate) specific power offset value(s) may be delivered within the corresponding signal/message. At this time, information about when to apply the corresponding power offset value(s) may also be indicated implicitly or explicitly. For example, when information related to a switching period for beam switching/cycling is configured together (with a beam switching command and/or a power offset value(s)) or configured separately, a UE may be configured to apply the corresponding power offset value(s) each time beam switching occurs according to the information related to the switching period (for example, when a pattern where beam switching is performed after transmission of the same beam two times is configured for a UE, the UE applies an indicated/corresponding power offset value only to the beam transmitted first after beam switching but does not apply the power offset value to the second transmitted beam).

And/or an indicator about whether to inherit or reset a previous TPC accumulation value may also be delivered together when an eNB delivers a beam change command (and/or beam switching command) to a UE. At this time, the indicator may be delivered by being included in an L1 and/or L2 command message which delivers a beam change command (and/or beam switching command).

If it is indicated to inherit, the TPC value (for example, +X dB, 0 dB, or −Y dB, . . . ) indicated by a specific closed-loop TPC field (transmitted together) may be accumulated to the TPC accumulation value inherited by the UE. Furthermore, the UE may apply/add the P_offset_beam value additionally to the inherited TPC accumulation value (as a one-time operation or whenever beam switching is performed in the case of beam switching).

If reset is indicated, the UE may apply the TPC value (for example, +X dB, 0 dB, or −Y dB, . . . ) indicated by a specific closed-loop TPC field (transmitted together) as an initial TPC accumulation value of the newly initialized (reset) PC procedure. For example, after calculating an open-loop pathloss control (OLPC) component, the UE may apply the indicated TPC value to the calculated OLPC component as a new, initial TPC accumulation value (in other words, accumulates the indicated TPC value to the OLPC component). Furthermore, the UE may apply/add the P_offset_beam value additionally to the OLPC component (as a one-time operation or each time beam switching is performed in the case of beam switching).

Also, SRS transmission may be essential for closed-loop PC, where a relationship between SRS transmission time and beam change/switching command delivery time needs to be specified clearly.

For example, when a UE performs beam change (or switching) from beam 1 to beam 2, it is customary to transmit an SRS in the beam 2 direction after beam change is performed, but by defining/configuring an operation of the UE to transmit the SRS in the beam 2 direction before beam change, more precise PC may be performed. To this end, at the time of aperiodic SRS triggering (for example, via an L1 message), in which beam to transmit the SRS may be indicated explicitly. Similarly, an operation of the UE may be defined/configured in such a way to perform transmission of a plurality of SRSs simultaneously at one time, the plurality of SRSs belonging to a predefined, specific "SRS beam set" pre-configured (separately). For example, when candidate beams which may be a target of SRS transmission are defined/configured by using beam 1 to beam 4, a UE configuration may be conducted so that the "SRS beam set" may include all of the four beams or only part of the beams (for example, {beam 2, beam 3}). The configuration may be re-configured by L3 (for example, by RRC), L2 (for example, by MAC) and/or L1 (for example, by DCI) signaling afterwards.

In this way, if a specific "SRC beam set" is configured, and an SRS triggering message is received, the UE may operate so that SRS transmission using/through beams belonging to the SRS beam set is performed on the SRS resource(s) indicated by a triggering message (or preconfigured in conjunction with each beam) (in the latter case, SRS transmission with respect to the beam 2 and SRS transmission with respect to the beam 3 are performed in conjunction with the respective SRS resource(s)).

In addition, if the same TRP Rx beam is retained, but only the UE Tx beam has to be changed due to beam blockage, a kind of fallback mode power control method may be defined/configured. For example, while separate/independent power control parameter(s) for the second best beam (pair) are determined/configured/stored during the UL beam sweeping procedure, the UE may be configured to initiate UL transmission based on specific fallback mode power control (for example, SRS transmission, PUCCH transmission and/or PUSCH transmission). More specifically, given that a first best Tx beam and/or Rx beam (pair), second best Tx beam and/or Rx beam (pair), and so on in a specific direction are determined by UL beam management, and this information is provided from a UE to an eNB or vice versa, when the UE first performs specific UL transmission (for example, SRS transmission, PUCCH transmission and/or PUSCH transmission), beamforming transmission/reception which takes into account the first best Tx beam and/or Rx beam (pair) may be initiated. At this time, an operation may be defined/configured so that when retransmission is attempted due to the reason that demodulation of the transmission signal at the receiver (for example, eNB) fails (for example, the receiver sends NACK as feedback), the transmitter (for example, UE) is made to perform the fallback mode power control and/or retransmission based on other beam (pair). In particular, in a system to which "synchronous HARQ" is applied, where the system is defined/configured so that retransmission is initiated according to a scheduled timeline while an explicit scheduling grant for retransmission is not provided separately, a specific Tx beam and/or Rx beam (pair) and/or specific power control parameter(s) (which include a P_offset_beam value (for each retransmission)) to be applied for the n-th retransmission (for n=1, 2, . . . ) may be defined/configured/provided to the UE beforehand in the form of a specific pattern, and the UE may initiate UL transmission/retransmission based on the specific Tx beam and/or Rx beam (pair) and/or specific power control parameter(s).

At this time, a different transmission method may be used depending on whether an UL transmission target of the UE is PUCCH or PUSCH. For example, in the case of PUCCH, an associated configuration for using/applying power control parameter(s) (including a related P_offset_beam value (for each retransmission)) (as a fallback) for the case where a second best UE Tx beam is used with respect to the TRP Rx beam set for the first best (UL) beam pair by the eNB may be provided, and the UE may initiate transmission/ retransmission based on the provided associated configuration. In the case of PUSCH, an associated configuration for using/applying power control parameter(s) (including a related P_offset_beam value (for each retransmission)) for the second best (UL) beam pair may be provided, and the UE may initiate transmission/retransmission based on the provided associated configuration.

A specific k-th optimal Tx and/or Rx beam (pair) applied when transmission in the form of the fallback described above is performed (for example, specific n-th retransmission) may be configured to have a relatively wider beam width. In particular, this configuration may be configured/applied to be used as a fallback (for example, for the purpose of dealing with an error occurrence with respect to the first optimal beam (pair)). And/or at the time of fallback transmission (for example, n-th retransmission), the UE operation may be configured/restricted in advance so that the aforementioned "beam switching" transmission is initiated.

2-2. Power Transient Period

In general, it is expected that the amount of information conveyed via an UL data channel would be much larger than that conveyed via UL control channel. Therefore, the required power for UL data channel transmission may also be larger than needed for transmission of the UL control channel. For NR design, TDM may be considered as a multiplexing structure between UL data and control channels for latency reduction, flexible UL/DL configuration, and analog beamforming. If UL data and control channels are multiplexed according to the TDM scheme, it may be necessary to handle power imbalance between the two different channels relatively larger compared to the current LTE system. Moreover, taking into account various OFDM numerology (for example, different subcarrier spacing or symbol duration) used for NR, it may be necessary to handle a power transient period between UL data and control channels for a specific numerology (for example, large subcarrier spacing).

As a result, it is necessary to consider an additional feature for UL power control in the NR such as an analog beamforming operation and a power transient period.

2-3 Per-TRP and Per-Power Control for Each TRP and Layer

Coordinated transmission schemes across multiple intra/inter-TRPs may be discussed. In particular, for high frequency bands in NR, the number of dominant rays per TRP or single panel may be limited, which, for example, is observed up to rank 2 for most cases. Therefore, in order to achieve high Single User (SU)-MIMO spectral efficiency, coordinated transmission schemes across multiple TRPs need to be thoroughly investigated in NR, including Coordinated multi-point (CoMP) dynamic point selection (DPS) and independent-layer joint transmission (JT). When DL-related DCI indicates the transmission rank and an applied coordinated scheme, the DCI decoding latency at the UE side may be one major problem whenever analog beamforming is applied at a given time instance. This is so because the DCI transmission may be performed by a serving TRP, but actual data transmission may be performed by another TRP.

In the case of independent-layer JT where particular layer(s) may be transmitted from different TRPs, the corresponding UL transmission power per layer-group may need to be configured and controlled by gNB, since at least pathloss from different TRPs may be different. Also, a separate UL power control procedure targeting a different TRP may be defined/configured from the aspect of UL-CoMP context.

As a result, UL power control per TRP and per layer-group needs to be defined/configured for properly supporting DPS and independent-layer JT in NR.

In what follows, a method for beam-specific power control for UL will be described.

In the case of beam-specific power control, NR defines beam specific open- and closed-loop parameters. Furthermore, NR defines beam common parameters. Details on "beam specific" may be defined, especially regarding handling layer/layer-group/panel specific/beam group specific/beam pair link specific power control.

If the UE may be configured for two waveforms, gNB may recognize the power headroom differences for the different waveforms. Regarding the aforementioned fact, a configuration/specific/report offset may be defined, and details of power control parameters such as P_c, max or other open-/closed-loop parameters.

Codebook based transmission for UL may be supported at least by the following signaling in UL grant:

SRS resource indicator (SRI)+Transmit PMI (TPMI)+Transmit Rank Indicator (TRI), where TPMI may be used to indicate preferred precoder over SRS ports of SRS resources selected/indicated by the SRI. When a single SRS source is configured, SRI may not exist/may not be signaled. In this case, TPMI may be used to indicate preferred precoder over the SRS ports of a configured single SRS resource.

Furthermore, an indication about selection of a plurality of SRS resources may be supported.

For N closed-loop power control procedures, namely, $f_c(i,l)$ for NR PUSCH power control for a serving cell (c), the following operating assumption may be configured/defined:

N is up to 2.

In the case of accumulative TPC command mode, the closed-loop power control process (f(i)) may be reset by RRC reconfiguration of $P_0$ and $\alpha$.

Power Headroom (PH) calculation for PUSCH transmission may be supported, where, for example, the PH may be calculated by Equation 7 below.

$$PH_c = P_{cmax,c}(i) - \{10 \log_{10}(M_{PUSCH,c}(i)) + P_{0,c}(j) + \alpha_c(j) \cdot PL_c(k) + \Delta_{TF,c}(i) + f_c(i,l)\} \quad \text{[Equation 7]}$$

In Equation 7, $P_{CMAX,c}(i)$ may correspond to UE transmission power configured for a serving cell c in PUSCH channel transmission having a transmission period i. $M_{PUSCH,c}(i)$ may correspond to the PUSCH resource allocation bandwidth expressed in terms of the number of resource blocks in PUSCH transmission having a transmission period i for a serving cell c. $P_{0,c}(j)$ may be obtained by a sum of a constituting element $P_{O\_NOMINAL\_PUSCH,c}(i)$ and $P_{O\_UE\_PUSCH,c}(j)$. $\alpha_c(j)$ may be indicated by an upper layer parameter (alpha-ue-pusch-withoutgrant). $PL_c(k)$ may be a downlink pathloss estimate calculated in dB units by the UE with respect to a serving cell c by using a reference single resource k. $\Delta_{TF,c}(i)$ may correspond to a component for adjusting PUSCH transmission power for a serving cell c. $f_c(i,l)$ corresponds to a PUSCH power control adjustment state in PUSCH transmission having a transmission period i for a serving cell c. Also, j represents a parameter set index, and l represents a PUSCH power control adjustment state index.

PH may be calculated with respect to current transmission and/or non-current transmission.

Absolute TPC command mode may be supported for NR-PUSCH. And/or K_PUSCH may also be supported. At this time, when the accumulative TPC mode is supported, K_PUSCH corresponds to the time offset (which may be interpreted by RRC and/or a predefined table) indicating a command time to be accumulated.

PUSCH power control in NR may support Equation 8, and Equation 8 may be used for a UE to determine power of PUSCH transmission having a transmission period i for a serving cell c.

$$P_{PUSCH}(i) = \min \left\{ \begin{array}{l} P_{CMAX,c}(i), \\ 10\log_{10}(M_{PUSCH,c}(i)) + P_{0,c}(j) + \\ \alpha_c(j) \cdot PL_c(k) + \Delta_{TF,c}(i) + f_c(i, l) \end{array} \right\}$$ [Equation 8]

Regarding the parameters of Equation 8, the descriptions given for Equation 7 may be applied in the same manner.

For the pathloss measurement RS indication, k may be indicated by a beam indication for PUSCH (if present). A linkage between PUSCH beam indication and k which is the index of a DL RS resource for PL measurement may be preconfigured via upper layer signaling.

If PUSCH beam indication is not present, only one k value is RRC configured in a UE-specific manner.

The value of $P_0$ may be composed of a cell-specific component and a UE-specific component. At least three cell-specific component values of $P_0$ may be configured.

The alpha ($\alpha$) value may be 1 by default before UE specific configuration. Candidate values of a may be the same as in the LTE.

j may be configured by considering the following aspects:
Grant-based PUSCH, grant-free PUSCH for message (msg) 3, and PUSCH
PUSCH beam indication (if present) for grant-based PUSCH
Logical channel of PUSCH
Slot sets (if supported)
Working assumption: for two uplinks of supplementary UL (SUL) band combination If N=2 (number of closed loop procedures) is configured for UE, l may be configured by considering the following aspects:
PUSCH beam indication (if present) for grant-based PUSCH
Slot sets (if supported)
Grant-free PUSCH and grant-based PUSCH
Logical channel(s) carried by PUSCH
Working assumption: for two uplinks of SUL band combination
Whether $\Delta_{TF}$ takes into account received SNR target difference between DFT-s-OFDM and CP-OFDM or not $P_{CMAX,c}$ may be supported, which reports Power Headroom (PHR) corresponding to NR PUSCH only transmission. The above may be supported at least for sub-6 GHz.

One PHR format may be supported: PH and $P_{CMAX,c}$. The PHR report may be restricted for short UE timeline cases (for example, virtual PHR report).

Closed power control commands by downlink DCI for PUCCH power control and by uplink grant for PUSCH power control may be supported. And/or the above may also be supported for SRS.

Closed power control commands by group common DCI with TPC-PUSCH-RNTI, TPC-PUCCH-RNTI, and TPC-SRS-RNTI may be supported.

Regarding NR PUCCH power control in slot i for a serving cell c, $P_{CMAX,c}(i)$, $P_{0_{PUCCH}}(F)$, $PL_c(k)$, $g(i)$ may be supported as shown in Equation 9. In particular, Equation 9 may be used for a UE to determine power of PUCCH transmission with a transmission period i for a primary cell c.

$$P_{PUCCH}(i) = \min \left\{ \begin{array}{l} P_{CMAX,c}(i), \\ P_{0\_PUSCH} + PL_c(k) + 10\log_{10}(M_{PUSCH,c}(i)) + \\ \Delta_{F\_PUSCH}(F) + \Delta_{PUSCH\_TF,c}(i) + g(i) \end{array} \right\} [dBm]$$ [Equation 9]

In Equation 9, $P_{CMAX,c}(i)$ may correspond to UE transmission power configured for a serving cell c in PUCCH channel transmission having a transmission period i. $PL_c(k)$ may be a downlink pathloss estimate calculated in dB units by the UE with respect to a primary cell c by using a reference single resource k. $M_{PUSCH,c}(i)$ may correspond to the PUCCH resource allocation bandwidth expressed in terms of the number of resource blocks in PUCCH transmission having a transmission period i for a serving/primary cell c. $\Delta_{F\_PUCCH}(F)$ may be provided by higher layer parameters. $\Delta_{PUCCH\_TF,c}(i)$ may correspond to a component for adjusting PUSCH transmission power for a primary cell c. g(i) corresponds to a current PUCCH power control adjustment state in PUCCH transmission having a transmission period i for a primary cell c.

F may represent a PUCCH format index. For example, F=0 may represent PUCCH format 0; F=1, PUCCH format 1; F=2, PUCCH format 2; and F=3, PUCCH format 3.

$P_{0\_PUCCH}$ is a parameter composed of a sum of a parameter $P_{0\_NOMINAL\_PUCCH}$ configured by higher layers and a parameter $P_{0\_UE\_PUCCH}$ configured by higher layers.

k corresponds to the index of RS resource(s) for pathloss measurement, which are RRC configured. k values may be configured by RRC signaling. Or k may not be determined by RRC configuration.

Definition and notation of $P_{CMAX,c}(i)$ may be changed for a region above 6 GHz.

In NR, full pathloss compensation for NR PUCCH power control may be supported. In Equation 9, 10*log 10(M_PUCCH,c)(i)) factor may be deleted. Also, in Equation 9, $P_{0\_PUCCH}$ may be changed to $P_{0\_PUCCH}(b)$. Also, in Equation 9, g(i) may be changed to g(i, l).

Multiple $P_{0\_PUCCH}(b)$ may be configured by RRC signaling.

In NR, up to 2 closed-loop power control procedures (namely, l). The closed-loop control procedure may be configured by RRC signaling. In the closed-loop control procedure, reset (or beam change) may be triggered by RRC reconfiguration of $P_0$. In the closed-loop control procedure, only accumulative TPC commands may be supported.

Also, NR may support $\Delta_{PUCCH\_TF,c}(i)$ to reflect at least UCI payload size, UCI type (for example, SR, HARQ, CSI), different coding gains, PUCCH format, coding schemes, and other effective coding rates. $\Delta_{PUCCH\_TF,c}(i)$ may or may not include $M_{PUCCH,c}(i)$. $M_{PUCCH,c}(i)$ may be related to the PUCCH bandwidth (BW) of slot i. $\Delta_{PUCCH\_TF,c}(i)$ may take into account received SNR target difference between DFT-s-OFDM and CP-OFDM.

For PRACH/PUSCH/PUCCH/SRS on an SUL carrier associated with an NR DL/UL carrier, the maximum pathloss including penetration loss difference between two UL carriers to be compensated is, for example, 76 dB. This maximum value is based on the assumption that the downlink carrier frequency may be up to 70 GHz.

In NR, SRS power control may also be supported, and Equation 10 below may be used for determining power of SRS transmission with a transmission period i for a serving cell c.

$$P_{SRS,c}(i) = \{P_{CMAX,c}(i), P_{0,SRS,c} 10 \log_{10}(M_{SRS,c}) + \alpha_{SRS,c} \cdot PL_c(k1) + h_{SRS,c}(i)\} \quad \text{[Equation 10]}$$

In Equation 10, $P_{CMAX,c}(i)$ may correspond to UE transmission power configured for a serving cell c in SRS transmission having a transmission period i. $P_{0\_SRS,c}$ and $\alpha_{SRS,c}$ may be provided by higher layer parameters. $M_{SRS,c}$ may correspond to the SRS bandwidth expressed in terms of the number of resource blocks in SRS transmission for a serving cell c. $PL_c(k1)$ may be a downlink pathloss estimate calculated in dB units by the UE with respect to a serving cell c by using a SRS resource set k1. $h_{SRS,c}(i)$ corresponds to a power control adjustment state in SRS transmission having a transmission period i for a serving cell c.

A unified power control equation may be defined regardless of whether SRS is intended for DL/UL CSI acquisition or beam management as shown above ($P_{SRS_{OFFSET},c}$ may be introduced).

In the case of $h_{SRS,c}(i)$, at least the following may be configured by RRC for a serving cell c in which the UE is configured with PUSCH:

$h_{SRS,c}(i) = f_c(i,l)$, where l=1, 2.

$h_{SRS,c}(i) = 0$

When SRS power control is tied with PUSCH power control, an additional closed-loop circuit for SRS power control may or may not be supported.

$h_{SRS,c}(i)$ value when SRS power control is not tied with PUSCH power control may be defined separately.

$h_{SRS,c}(i)$ may also be defined when both of the accumulative TPC and the absolute TPC support SRS power control.

In the case of a serving cell c where UE is not configured for PUSCH, the closed-loop power control process for SRS is configured separately and is not linked to a closed-loop power control process for PUSCH of other serving cell(s) in which the UE is configured for PUSCH.

In the case of PL estimation, each SRS resource set is associated with X1 DL reference signal(s) for PL estimation, and X1 may be configured to be more than '1'. The maximum number of PL estimates to be maintained by the UE may be limited to X2. PL estimation associated with k1 has to be kept unchanged for each configured SRS resource set.

It may be assumed that a UE expects the gNB to configure the same type of time-domain behavior (namely periodic, semi-persistent, or aperiodic) for all SRS resources in an SRS resource set.

Regarding the definition of $M_{SRS,c}(j)$, if it is assumed that M PRBs are allocated for both 15 kHz subcarrier spacing (SCS) and 120 kHz SCS, a few of alternatives may be derived as follows:

Alt. 1: $M_{SRS,c}(j)$ may be expressed in terms of the number of PRBs based on 15 kHz regardless of the number of PRBs allocated for SRS transmission (for example, for 15 kHz SCS, $M_{SRS,c}(j)=M$ while, for 120 kHz SCS, $M_{SRS,c}(j)=8M$)

Alt. 2: $M_{SRS,c}(j)$ may be expressed in terms of the number of PRBs allocated for SCS transmission (for example, for 15 kHz SCS, $M_{SRS,c}(j)=M$ while, for 120 kHz SCS, $M_{SRS,c}(j)=M$)

Alt. 3: $M_{SRS,c}(j)$ may be expressed in terms of the number of PRBs based on 15 kHz SCS for the case of sub-6 GHz and in terms of the number of PRBs based on 60 kHz SCS for above 6 GHz (for example, for 15 kHz SCS, $M_{SRS,c}(j)=M$ while, for 120 kHz SCS, $M_{SRS,c}(j)=2M$).

In NR, since the required power for UL performance is different for each individual beam for a UE, differentiation of beam-specific open-loop and closed-loop parameters between different beams for a UE may be supported.

Especially for the accumulative TPC process, however, it needs to be further investigated about whether PC parameter separation per beam would be superior compared with a common TPC accumulation procedure regardless of beam change or switching. The latter indicates that the TPC accumulation process is not reset even though a serving beam is changed by a beam management procedure, considering that an already stabilized transmit power level is desired to be kept unchanged as much as possible unless beam change occurs at a different TRP. As a target service unit requiring higher reliability such as URLLC and enhanced Vehicle-to-everything (eV2X), there may be a configurable additional power offsets to be applied to the TPC accumulation process whenever beam change or switching occurs within the same TRP, by which potential power control mismatch due to the beam change/switching may be alleviated.

As a result, for accumulative TPC procedures, a configurable additional power offset to be applied to a common TPC accumulation procedure needs to be supported whenever beam change or switching occurs within the same TRP according to a target service requiring higher reliability (for example, URLLC and eV2X).

Regarding OLPC, proper DL RS such as an SS block (PBCH DMRS) and CSI-RS for pathloss compensation needs to be defined at least for UEs supporting beam correspondence. This behavior may be expressed in terms of the following parameters.

For OLPC, at least one of $P_{cmax,c}$, $M_{PUSCH,c}(i)$, $P_{0,c}(j)$, $\alpha_c(j)$, and $PL_c(k)$ parameters as described in detail with reference to Equation 7 may be supported for NR PUSCH power control for a serving cell c, where i may correspond to the slot number/index, j the parameter set number/index, and k DL RS number/index. In addition, support for other parameters (for example, $\Delta_{TF,c}$) is not precluded. Based on the parameters, PUSCH transmission power may be determined/calculated by Equation 11 below.

$$P_{PUSCH,c}(i) = \min\left\{\begin{array}{l} P_{CMAX,c}, \\ 10\log_{10}(M_{PUSCH,c}(i)) + P_{0,c}(j) + \\ \alpha_c(j) \cdot PL_c(k) + f_c(i,j) \end{array}\right\} \quad \text{[Equation 11]}$$

A characteristic point in Equation 11 is that k which indicates a specific DL RS index for PL calculation may be variable/different for each j which is an (OL)PC parameter set index (namely for each parameter set). This indicates that a basic PC equation is determined/calculated based on a specific/fixed (OL)PC parameter set j and thereby, indicates which DL RS(s) index k is applied/linked may be varied. In other words, it indicates that a variable DL RS (index k) may be applied to a specific/fixed parameter set (index j).

As described above, when the equation 11 is applied to a specific (OL)PC parameter set j, it is necessary to propose a method for determining a DL RS(s) index k associated with the parameter set. Therefore, in what follows, various methods for determining k are proposed, and at least one of the following methods may be applied. Methods for determining k may be divided into implicit indication methods, explicit indication methods and/or methods mixing/combining the aforementioned methods:

a) Implicit Indication Method

A UE may be defined/configured/indicated to directly apply the index k' of specific DL RS(s) (for example, ((spatial)-QCLed) CSI-RS resource(s) (expressed in terms of CRI) and/or SS block(s)) configured/linked/applied (by a PDCCH beam indication) to a specific (or serving) control (channel) resource set (CORESET) as a DL RS(s) index k (namely k=k'). The implicit indication method may be applied/defined/configured as a kind of "default (and/or fallback) behavior" performed before other indication method (for example, explicit indication method) is applied. In other words, before other explicit indication is received, the UE may be defined/configured to apply the index k' of DL RS(s) (which, for example, includes SS block(s) used for initial access (for example, discovered/attached during a RACH procedure)) associated/linked (for the purpose of spatial QCL) to a specific CORESET (in particular, serving-CORESET (CORESET for which a serving PDCCH is configured) and/or primary CORESET) configure/indicated for the UE itself as the k (namely the DL RS index k used for PUSCH transmission power calculation). At this time, although the UE may follow a separate indication (for example, explicit indication method) proposed in the present specification, if it is the case that ambiguity may be caused about which operation the UE has to follow while the corresponding indication operation is reconfigured (by RRC and/or MAC CE), the "fallback operation" may indicate an alternative/default operation which may be applied for the aforementioned case. And/or the "fallback operation" may indicate an alternative/default operation which may be applied for a special situation in which ambiguity may be caused during a process where the UE enters discontinuous reception (DRX) and/or idle mode from RRC-connected state and transitions back to active mode.

If one or more DL RS(s) are configured (for the specific (OL)PC parameter set j), which DL RS (for example, k-th DL RS) is to be applied for PL calculation among the plurality of DL RSs may be defined/configured by UE implementation (namely an independent operation of the UE itself). In other words, if it is the case that the eNB has configured one or more DL RS(s) for the UE from the start, the UE may select/consider only appropriate, specific RS(s) (which shows/has the best measurement value) within the configured DL RS(s) and apply the selected/considered RS(s) for PL calculation.

b) Explicit Indication Method

A UE may be configured/indicated with information related to DL RS(s) index k (or a set of ks) which may be applicable (or which has to be applied) for each specific (OL) PC parameter set j. The explicit indication/configuration may be delivered to the UE through RRC and/or MAC CE signaling. For example, the eNB configures the UE with k set-related DL RS(s) set information through RRC signaling; then, from the information, the eNB may transmit, to the UE through MAC CE signaling, an activation indication (or deactivation of other RS(s) which should not be applied) for a specific DL RS(s) (index) which has to actually/currently be applied. And/or through MAC CE signaling, the eNB may configure/indicate the UE with an operation for updating/replacing preconfigured, k set-related DL RS(s) set information with new information.

Among the proposed operations/methods, for at least one of them, whether the corresponding operation/method itself is activated (or may be activated) may be configured/indicated by a higher layer indication (for example, by RRC and/or MAC CE signaling).

It is apparent that the proposed PUSCH PC methods, described with reference to PUSCH above, may be applied to the PUCCH PC methods in the same/similar manner (in other words, in the methods above, PUSCH may be replaced with PUCCH). For example, configurations for the DL RS(s) (with index k) for PUCCH PL calculation may be provided from a higher layer by RRC signaling/parameters as shown below:

'num-pucch-pathlossReference-rs': this parameter indicates the number of DL RS configurations for measuring pathloss. For each configuration, an individual pathloss estimate is maintained by the UE and is used for PUCCH power control. The number of RS configurations may be N, where N is 1, 2, 3, or 4 (which indicates 1 to 4 pucch-pathlossReference-config).

'pucch-pathlossReference-rs-config': this parameter indicates configuration of RS (for example, CSI-RS configuration or SS block) used for PUCCH pathloss estimation. The number of RS configurations may be N, where N is 1, 2, 3, or 4 (which indicates pucch-pathlossReference-rs ranging from 1 to the number indicated by num-pucch-path lossReference-rs).

At this time, for example, when all of the DL RSs with an index N=1, 2, 3, 4 in the upper layer (for example, CSI-RS configuration or SS block) are explicitly configured/provided to the UE, it is necessary to explicitly specify which of the N DL RSs to apply to which PUCCH transmission. Therefore, a UE/eNB operation according to at least one of the following options for specifying explicitly which one to apply to which transmission:

a) Option 1

First of all, the implicit indication method proposed above may be defined/configured. For example, according to option 1, in the case of PUCCH transmission triggered by DCI detection (for example, event-driven) from the DL control channel transmitted through a specific CORESET such as the PUCCH intended for ACK/NACK transmission (namely, in the case where PUCCH transmission is triggered by the DL control channel transmitted through the CORESET), the UE may apply the DL RS linked/associated/related to the DL control channel which has triggered the corresponding PUCCH transmission (for example, a (spatially) QCLed DL RS to a PDCCH DMRS) to the PL calculation. In this case, even if the DL RS associated/linked/related to the DL control channel (for example, the (spatially) QCLed DL RS to the PDCCH DMRS) does not belong to a list of N upper-layer configured/signaled DL RSs, the UE may still apply/use the DL RS associated/linked/related to the DL control channel as a DL RS of PL calculation for the PUCCH PC. And/or only when the DL RS (for example, (spatially) QCLed DL RS) coincides with a specific DL RS belonging to the list including N upper-layer configured/signaled DL RSs (namely, only when the DL RS belongs to the list), a condition for application/use, which indicates the DL RS to be applied/used as a DL RS of PL calculation for the PUCCH PC, may be specified/configured.

b) Option 2

Among N configured DL RSs, the n-th (n=1, 2, . . . , N) RS is linked/applied to a specific PUCCH resource configuration (for example, through upper layer signaling, dynamic signaling and/or implicit signaling). In other words, a configuration such that a specific DL RS (or a DL RS in a specific order) among N DL RSs is associated/tied with a specific PUCCH resource configuration (namely each DL RS is configured to be associated with/to correspond to/to be mapped to a specific PUCCH resource configuration) may be provided to a UE.

As one embodiment, which PUCCH resource configuration is provided to the UE may be configured/signaled separately by the upper layer. At this time, each PUCCH resource configuration, for example, may be one PUCCH (resource) configuration unit accompanied by a specific configuration parameter such as a specific PUCCH format/type/resource. At this time, to allow the n-th DL RS to be used/applied for PL calculation for the k-th PUCCH resource configuration, the linkage between the two may be configured/indicated explicitly and/or implicitly. At this time, n may represent the index/order of a DL RS, and k may represent the index/order of a PUCCH resource configuration.

As an example where the linkage is implicitly configured/indicated, a situation where n=1 or 2 (namely a total of two DL RSs), and k=1, 2, or 3 (namely a total of three PUCCH resource configurations) may be assumed. In this case, two DL RSs may be mapped/linked sequentially to three PUCCH resource configurations as follows.

For PUCCH resource configuration k=1, RS for n=1 for PL calculation is implicitly associated.
For PUCCH resource configuration k=2, RS for n=2 for PL calculation is implicitly associated.
For PUCCH resource configuration k=3, RS for n=1 for PL calculation is implicitly associated.

In other words, like a method where n is sequentially and implicitly linked/associated/mapped to each PUCCH resource configuration one by one (for example, in the ascending or descending order), and when one-to-one linkage/association/mapping of PUCCH resources is completed for all n, n is reset to 1 and is again sequentially and implicitly linked/associated/mapped to the remaining (k–n) PUCCH resource configurations one by one, a pre-defined/pre-configured/pre-determined rule which circulates implicit linkage/association/mapping of n to k may be proposed (at this time, k may also be sequentially and implicitly linked/associated/mapped to n (for example, in the ascending or descending order). In this case, N-to-1 relationship may be established between k and n. According to the rule, the UE may associate a DL RS with a PUCCH resource configuration without ambiguity and apply the DL RS associated with the PUCCH resource configuration to PL calculation.

In another example, if n=1 or 2 (namely, a total of two DL RSs) and k=1, 2, 3, 4, or 5 (namely, a total of 5 PUCCH resource configurations), k and n may be linked/associated/mapped to each other without ambiguity as follow.

For PUCCH resource configuration with k=1, RS for n=1 for PL calculation is implicitly associated.
For PUCCH resource configuration with k=2, RS for n=2 for PL calculation is implicitly associated.
For PUCCH resource configuration with k=3, RS for n=1 for PL calculation is implicitly associated.
For PUCCH resource configuration with k=4, RS for n=2 for PL calculation is implicitly associated.
For PUCCH resource configuration with k=5, RS for n=1 for PL calculation is implicitly associated.

Embodiments modified in a particular manner according to an object similar to the above (for example, an object to link a DL RS for PL calculation to a PUCCH resource configuration through implicit linkage/association/mapping without ambiguity) also belong to the technical scope of the present invention.

And/or it is also possible to apply a method which combines/links the option 1 and 2 by configuring a priority condition for the two options. For example, the method may be configured/defined/indicated so that a UE applies the option 1 first (in other words, for a specific PUCCH resource configuration, a DL RS linked/associated/related to a DL control channel which has triggered PUCCH transmission is applied to PL calculation regardless of a list including N configured DL RSs or only when the DL RS coincides with at least one of N configured DL RSs belonging to the list), and/or for a specific PUCCH resource configuration to which the option 1 is not applied (for example, when the condition for applying the option 1 is not satisfied and/or when the corresponding situation is not relevant to applying the option 1 (for example, PUCCH transmission is not triggered by a specific DL control channel (for example, CSI reporting PUCCH and PUCCH for beam management and/or beam failure recovery)), the option 2 is applied. In other words, the UE may apply the option 1 by default, but when the condition for the option 1 is not satisfied (or when the condition for the option 2 is satisfied), the option 2 may be applied exceptionally.

As an example of the description above, if it is assumed that n=1 or 2 (namely, a total of two DL RSs), and k=1, 2, 3, 4, or 5 (namely, a total of 5 PUCCH resource configurations), n and k may be linked/associated/mapped to each other as follows.

For PUCCH resource configuration with k=1, RS following the option 1 is applied for the PL calculation.
For PUCCH resource configuration with k=2, RS for n=1 for PL calculation is implicitly associated.
For PUCCH resource configuration with k=3, RS following the option 1 is applied for the PL calculation.
For PUCCH resource configuration with k=4, RS for n=2 for PL calculation is implicitly associated.
For PUCCH resource configuration with k=5, RS for n=1 for PL calculation is implicitly associated.

In other words, according to the embodiment above, each PUCCH resource configuration may be linked/associated/mapped to a specific DL RS independently (according to the option 1 and/or option 2).

According to the method described above, a UE operation which determines a DL RS to be applied for PL calculation may be defined/configured/indicated.

The core components of the proposed methods may also be applied/extended to other UL transmission (for example, PUSCH transmission) in the same/similar way (in other words, in the embodiments above, PUCCH may be replaced with PUSCH). For example, like the PUCCH transmission above, an environment/system configured/distinguished by a specific PUSCH (or SRS) resource configuration may be linked/designated to a specific DL RS for each PUSCH resource configuration as in the embodiment/option above.

In the case of closed-loop power control (CLPC), an independent accumulative TPC command may be supported for each open-loop parameter set (namely $f_C(i,j)$). Here, $f_C(i,j)$ may reset triggering (for example, reconfiguration of a parameter set and/or explicit signaling).

Considering UL-CoMP operations, different DL RSs for pathloss compensation may be configured for each SRS resource for UL CSI acquisition. For UEs without beam correspondence, the pathloss compensation may be performed by pre-defined/configured function or rule based on a default type of DL RSs such as a set of SS blocks (PBCH DMRS) or configured CSI-RSs. In other words, information such as "a set of SS blocks (PBCH DMRS) or configured CSI-RSs" may be configured separately for a UE (for example, by RRC, MAC and/or DCI), the UE may perform a pathloss compensation operation according to/based on the configuration. And/or even if the UE is not configured separately, a DL RS for pathloss compensation may be limited to a specific (for example, default or lowest (or highest)-indexed (according to sorting by an average power level (for example, RSRP) and/or (previously/most recently) reporting at least one with the best power level according to the sorting)) "set of SS blocks (PBCH DMRS) or configured CSI-RSs" for a serving cell. And/or along with the operation, a specific calculation function such as max function or some weighted averaging function may be defined/configured.

As a result, for OLPC, proper DL RS for pathloss compensation has to be defined or configured for each SRS resource, and a pre-defined/configured function for the pathloss compensation has to be determined for UEs without beam correspondence.

Considering codebook-based transmission for UL, SRI in UL grant may indicate multiple selection of SRS resources capable of supporting multi-panel joint transmission in UL. Furthermore, each panel transmission associated with each indicated SRS resource may target different UL reception point in the context of UL-CoMP. To properly support this, NR network needs to be able to at least calculate accurate MCS for each different layer group corresponding to different SRS resource, by using a power control process separated for each SRS resource.

Generally, multiple ULPC processes for a UE need to be supported, and each ULPC process may be associated with at least one SRS resource configured to the UE. For example, while configured SRS resources ID #1 and #2 may be associated to the same ULPC process A, another configured SRS resource ID #3 may be associated to a different ULPC process B. ULPC processes A and B may target different reception points, and the SRS resources #1 and #2 which follow the same ULPC process A may be dynamically selected by the SRI indication in UL grant. When SRS resources #1 and #3 are jointly indicated by the SRI field in UL grant, for example, it may be interpreted as layer-group-separated UL multi-panel transmission and UL-CoMP joint reception operations at the gNB side.

In other words, independent power control may be employed for each indicated SRS resource, and/or the number of ranks/layers may be indicated/provided separately (in the same UL grant) for each indicated SRS resource, and/or (separate) TPMI information according to the number of ranks/layers may be indicated/provided (in the same UL grant) for each indicated SRS resource.

As a result, to properly support multi-panel UL transmission and UL-CoMP operations, multiple ULPC processes for a UE has to be supported, and each ULPC process may be associated with at least one SRS resource configured to the UE.

Figure 9:
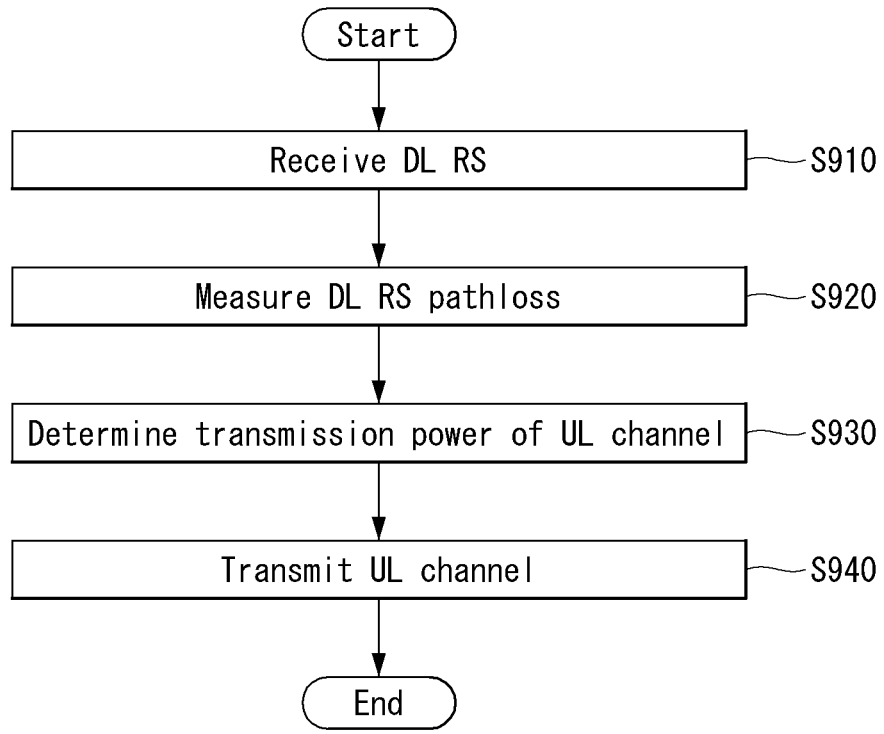
FIG. 9 is a flow diagram illustrating a method for UL power control of a UE according to one embodiment of the present invention.

FIG. 9 is a flow diagram illustrating a method for UL power control of a UE according to one embodiment of the present invention. The embodiments described above may be applied in the same/similar manner with respect to the flow diagram, and repeated descriptions thereof will be omitted.

First, the UE may receive a DL RS (S910). At this time, the DL RS may correspond to a CSI-RS and/or an SS block.

Next, the UE may measure DL pathloss by using the received DL RS (S920).

Next, the UE may determine transmission power of an UL channel by using measured pathloss (S930). The UL channel may correspond to the PUCCH or the PUSCH. The DL RS used for/as a basis for determining transmission power of the UL channel may be determined according to various embodiments based on the configuration information indicated by an eNB, where the configuration information may be indicated through RRC signaling (and/or MAC CE signaling).

As an embodiment, the configuration information may include/indicate the number of DL RSs for determining UL channel transmission power and/or index of a DL RS, and in this case, the UE may determine the DL RS indicated by the corresponding configuration information as the DL RS for obtaining/calculating/determining transmission power of the UL channel.

As another embodiment, if a specific DL RS indicated through configuration information is determined as the DL RS for determining UL channel pathloss, the specific DL RS may be updated in real time through MAC CE signaling. In other words, it may be interpreted that a DL RS is configured for a long-term basis through RRC signaling, and the DL RS is updated through MAC CE in a short-term basis.

As other embodiment, if a plurality of DL RSs are indicated through configuration information, a specific DL RS indicated through MAC CE signaling among the candidate DL RSs may be determined as a DL RS for determining UL channel transmission power.

As other embodiment, if there are a plurality of UL channels to be transmitted by the UE (in other words, there are multiple UL channels), a DL RS for determining UL channel transmission power may be determined independently for each UL channel resource configuration mapped to each of the plurality of UL channels. If at least one candidate DL RS is indicated through configuration information, a specific candidate DL RS associated with each UL channel resource configuration may be determined as a DL RS for determining UL channel transmission power. At this time, each UL channel resource configuration may be mutually associated with at least one candidate DL RS based on an index of each UL channel resource configuration, and an index of at least one candidate DL RS. For example, the indexes of a candidate DL RSs may be associated in the ascending order (or descending order) in a cyclic manner with the indexes of a plurality of UL channel resource configurations in the ascending order (or descending order), detailed descriptions of which are the same as in the embodiment above.

As other embodiment, a specific DL RS associated with the CORESET configured for the UE through configuration information may be determined as a DL RS for determining UL channel transmission power. In particular, if transmission of an UL channel is triggered by the DL channel transmitted through the CORESET, the specific DL RS may correspond to a CSI-RS and/or an SS block Quasi-co-Located (QCLed) with the DL channel transmitted through the CORESET. At this time, if at least one candidate DL RS is indicated through configuration information, the specific DL RS may be determined as a DL RS for determining UL channel transmission power only when the specific DL RS is included in the at least one candidate DL RS.

Lastly, the UE may transmit the UL channel (with the determined transmission power) (S940).

Meanwhile, although not shown in the flow diagram, if the UE receives a beam change (and/or switching) indication for the eNB, transmission power of the determined UL channel may be boosted as much as the amount of preconfigured power. In particular, this operation may be supported for providing a service requiring high reliability such as V2X, URLLC, and eMBB.

The device to which the present invention may be applied in general

Figure 10:
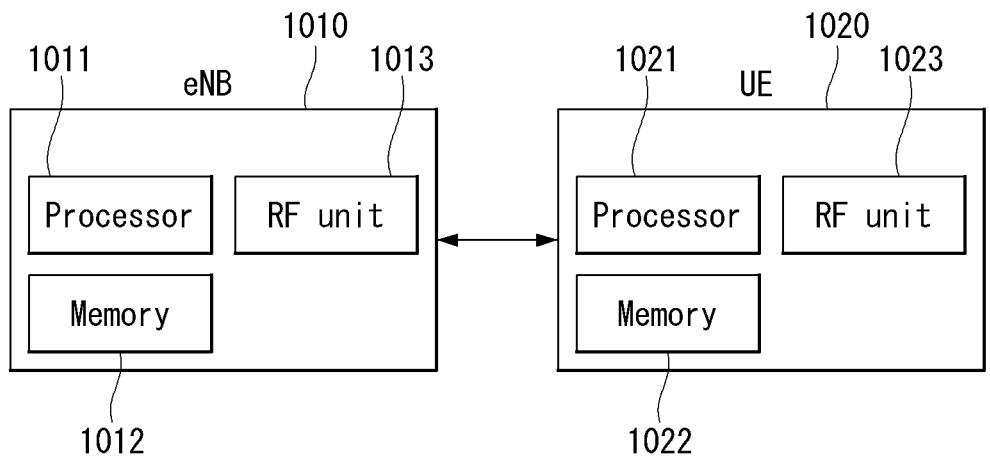
FIG. 10 is a block diagram of a wireless communication device according to one embodiment of the present invention.

FIG. 10 illustrates a block diagram of a wireless communication device according to one embodiment of the present invention.

Referring to FIG. 10, a wireless communication system comprises an eNB 1010 and a plurality of UEs 1020 located within the range of the eNB 1010.

The eNB 1010 comprises a processor 1011, memory 1012, and RF (Radio Frequency) unit 1013. The processor 1011 implements the functions, processes and/or methods described above. Layers of a wireless interface protocol may be implemented by the processor 1011. The memory 1012, being connected to the processor 1011, stores various kinds of information to operate the processor 1011. The RF unit 1013, being connected to the processor 1011, transmits and/or receives a radio signal.

The UE 1020 comprises a processor 1021, memory 1022, and RF unit 1023. The processor 1021 implements the functions, processes and/or methods described above. Layers of a wireless interface protocol may be implemented by the processor 1021. The memory 1022, being connected to the processor 1021, stores various kinds of information to operate the processor 1021. The RF unit 1023, being connected to the processor 1021, transmits and/or receives a radio signal.

The memory 1012, 1022 may be installed inside or outside the processor 1011, 1021 and may be connected to the processor 1011, 1021 via various well-known means. Also, the eNB 1010 and/or the UE 1020 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

Meanwhile, the term CA and/or B' in this document may be interpreted as indicating at least one of A and/or B.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The present invention applied to a 3GPP LTE/LTE-A/NR system is primarily described as an example, but may be applied to various wireless communication systems in addition to the 3GPP LTE/LTE-A/NR system.

What is claimed is:

1. A method for receiving an uplink channel by a base station (BS) in a wireless communication system, the method comprising:
    transmitting, to a user equipment (UE), first information indicating a first reference signal related to a pathloss calculation;
    transmitting, to the UE, update information related to updating the first information, wherein the update information includes second information indicating a second reference signal related to the pathloss calculation; and
    receiving, from the UE, the uplink channel,
    wherein the first information is updated to the second information based on the update information, and
    wherein a pathloss related to a transmission power of the uplink channel is determined based on the second reference signal.

2. The method of claim 1,
    wherein the first information is transmitted via Radio Resource Control (RRC) signaling, and
    wherein the updated information is transmitted via Medium Access Control (MAC) Control Element (CE) signaling.

3. The method of claim 2, wherein the uplink channel corresponds to Physical Uplink Control Channel (PUCCH) or a Physical Uplink Shared Channel (PUSCH).

4. The method of claim 2, wherein each of the first reference signal and the second reference signal corresponds to a Channel State Information (CSI)-RS or a Synchronization Signal/Sequence (SS) block.

5. The method of claim 4, further comprising:
    transmitting a downlink channel for triggering transmission of the uplink channel, through a Control Resource SET (CORESET).

6. The method of claim 5, wherein, based on that transmission of the uplink channel is triggered by the downlink channel transmitted through the CORESET, the first reference signal corresponds to the CSI-RS or the SS block Quasi-co-Located (QCLed) with the downlink channel transmitted through the CORESET.

7. The method of claim 2, further comprising:
    transmitting, to the UE, configuration information including a plurality of candidate reference signals for the pathloss calculation, and
    wherein one of the plurality of candidate reference signals is indicated based on the first information.

8. The method of claim 7, wherein the configuration information further includes information related to the number of the plurality of candidate reference signals.

9. The method of claim 7, wherein the first information comprises an index of the first reference signal.

10. The method of claim 7, wherein, based on that there exists a plurality of uplink channels to be received, the first reference signal is configured independently for each uplink channel resource configuration mapped to each of the plurality of uplink channels.

11. The method of claim 1, wherein before the first information is transmitted by the BS, a downlink reference signal associated with a specific Control Resource SET (CORESET) is used for the pathloss calculation.

12. The method of claim 1, wherein before the first information is transmitted by the BS, the pathloss is calculated based on a specific Synchronization Signal/Sequence (SS) block.

13. The method of claim 1, further comprising:
transmitting, to the UE, a plurality of parameter set configurations related to control of the transmission power, wherein each of the plurality of parameter set configurations is identified by an identifier.

14. The method of claim 1, further comprising:
transmitting, to the UE, a beam change indication for the BS,
wherein the transmission power of the uplink channel is increased as much as the amount of preconfigured power based on the beam change indication.

15. A Base Station (BS) configured to receive an uplink channel in a wireless communication system, the BS comprising:
a transceiver; and
at least one processor; and
at least one computer memory operably connectable to the at least one processor and storing instructions that, when executed by the at least one processor, perform operations comprising:
transmitting, to a user equipment (UE), first information indicating a first reference signal related to a pathloss calculation;
transmitting, to the UE, update information related to updating the first information, wherein the update information includes second information indicating a second reference signal related to the pathloss calculation; and
receiving, from the UE, the uplink channel,
wherein the first information is updated to the second information based on the update information, and
wherein a pathloss related to a transmission power of the uplink channel is determined based on the second reference signal.

* * * * *